(12) United States Patent
Asano et al.

(10) Patent No.: US 6,917,905 B2
(45) Date of Patent: Jul. 12, 2005

(54) MOLD DESIGN SYSTEM AND COMPUTER-READABLE RECORDING MEDIUM STORING MOLD DESIGN PROGRAM

(75) Inventors: Naoki Asano, Kawasaki (JP); Guo Fu, Kawasaki (JP); Hitoshi Kuroki, Kawasaki (JP); Guy Roberge, Quebec (CA)

(73) Assignee: Fujitsu Limited, Kawasaki (JP)

( * ) Notice: Subject to any disclaimer, the term of this patent is extended or adjusted under 35 U.S.C. 154(b) by 711 days.

(21) Appl. No.: 09/767,910

(22) Filed: Jan. 24, 2001

(65) Prior Publication Data

US 2001/0018622 A1 Aug. 30, 2001

Related U.S. Application Data

(63) Continuation of application No. PCT/JP99/01815, filed on Apr. 5, 1999.

(30) Foreign Application Priority Data

Jul. 28, 1998  (JP) ............................................ 10-212639

(51) Int. Cl.[7] ......................... G06F 19/00; G06F 17/50; G06F 17/10
(52) U.S. Cl. ................................. 703/1; 703/2; 700/97
(58) Field of Search .............................. 703/1, 2, 6–7, 703/9; 700/97, 100–101, 102, 103

(56) References Cited

U.S. PATENT DOCUMENTS

| | | | |
|---|---|---|---|
| 4,641,270 A | | 2/1987 | Lalloz et al. |
| 5,812,402 A | * | 9/1998 | Nishiyama et al. ........... 700/97 |
| 5,822,206 A | * | 10/1998 | Sebastian et al. ............ 700/97 |
| 6,021,358 A | * | 2/2000 | Sachs .......................... 700/98 |
| 6,546,362 B1 | * | 4/2003 | Guo et al. ..................... 703/1 |

FOREIGN PATENT DOCUMENTS

| | | | |
|---|---|---|---|
| EP | 1094412 | 4/2001 | |
| JP | 07152820 A | 6/1995 | ........... G06F/17/50 |
| JP | 07296191 A | 11/1995 | ........... G06T/17/00 |
| JP | 08300416 A | 11/1996 | ........... B29C/45/26 |
| JP | 09147144 A | 6/1997 | ........... G06T/17/20 |

OTHER PUBLICATIONS

Bilge et al., An Integrated Computer–Aided Process Planning System for Injection Mold Manufacturing, 1996 IEEE.*
Zhou et al., A Feature–Based Approach to Automatic Injection Mold Generation, Apr. 2000. IEEE.*
Tseng et al., Knowledge–Based Mold Design for Injection Molding Processing, 1990, IEEE.*
Nee, A.Y. C. et al., Automatic Determination of 3–D Parting Lines and Surfaces in Plastic Injection Mould Design dated Jan. 5, 1998.
Japanese Patent Abstract No.: 07152820 dated Jun. 16, 1995.
Derwent Publications Ltd., XP–002220034 dated 1995.
Japanese Patent Abstract for Japanese Publication No. 09–231410.

* cited by examiner

*Primary Examiner*—Hugh Jones
(74) *Attorney, Agent, or Firm*—Staas & Halsey LLP

(57) ABSTRACT

It is made possible to promptly determine an accurate parting line. Two-dimensional projection means produces two-dimensional projection data by projecting edges of a product shape represented by three-dimensional graphic data onto a plane perpendicular to a mold opening direction. Parting line determination means sequentially determines, out of candidate edges contiguous to a determined parting line already determined as parting line, a candidate edge forming a largest interior angle with the determined parting line at a contact point therewith on the two-dimensional projection data, as the parting line. This makes it possible to determine a parting line of a mold for molding the product shape represented by the three-dimensional graphic data.

13 Claims, 41 Drawing Sheets

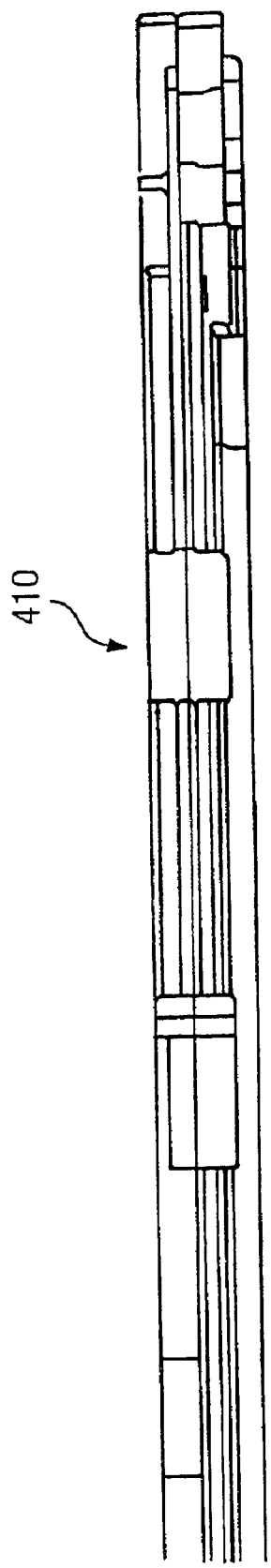
FIG. 39
PRIOR ART
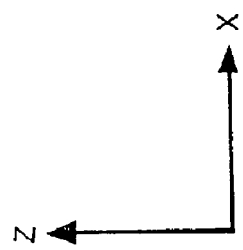

MOLD DESIGN SYSTEM AND COMPUTER-READABLE RECORDING MEDIUM STORING MOLD DESIGN PROGRAM

This application is a continuing application, filed under 35 U.S.C. §111(a), of International Application PCT/JP99/01815, filed Apr. 5, 1999, it being further noted that priority is based upon Japanese Patent Application 10-212639, filed Jul. 28, 1998.

BACKGROUND OF THE INVENTION (1) Field of the Invention

This invention relates to a mold design system for designing a mold and a computer-readable recording medium storing a mold design program, and more particularly to a mold design system for designing a mold based on three-dimensional CAD data of a product and a computer-readable recording medium storing a mold design program.

(2) Description of the Related Art

Process of molding plastics includes injection molding. In injection molding, a fixed amount of a molten plastic material is injected into an injection mold to mold the plastics into shape. The plastics is thereafter removed from the mold, thus obtaining a product (including a part etc.). When a plastic product or the like is designed, therefore, it is necessary that a mold for making the product should also be designed at the same time. Present-day product design is in most cases carried out by means of CAD (Computer Aided Design), and accordingly, molds are designed based on CAD data of products.

FIG. 34 shows CAD data of a product, by way of example. In the figure is shown a product shape 200 of a square vessel, which is represented by three-dimensional CAD data. This product shape 200 is constructed by a plurality of planes called faces 201. An intersecting line between the faces is an edge 202.

After the above product shape 200 has been completed, a mold surrounding the space of the product shape is designed. Since it is required to remove a molded product, the mold is comprised of at least two upper and lower parts (along a Z axis). The upper part is called a cavity-side part, and the lower part is called a core-side part. In designing the mold, first, a parting line as a boundary between the upper and lower parts is determined. Basically, the parting line is determined with reference to edges which form the outermost peripheral profile of the product. The parting line is determined by designating edges of the product shape, which is carried out by the designer himself. In the illustrated example, a set of edges forming the outermost peripheral profile as viewed along the Z axis forms the parting line 210.

Once the parting line of the product shape is determined, it is possible to cause a computer to calculate profiles of the mold based on CAD data of the product shape 200.

FIG. 35 shows an example of the mold. As shown in the figure, the core-side part 220 is provided with a protrusion in the form of a quadrangular prism, while the cavity-side part 230 is provided with a square hole. An outer periphery of the protrusion of the core-side part 220, and a rim of the hole of the cavity-side part 230 are parting lines 221, 231, respectively.

As described above, by designating the parting line(s) out of the product shape 200 (shown in FIG. 34), it is possible to determine the shape of the mold as shown in FIG. 35.

Now, although it is ideal that a mold is constructed by only two upper and lower parts, it is impossible to avoid existence of an undercut portion if a product shape becomes complicated.

FIG. 36 shows three-dimensional CAD data of a product having an undercut portion, by way of example. This product shape 300 is obtained by forming a hole 310 in a side face portion of the product shape 200 appearing in FIG. 34. The hole 310 is an undercut portion. If such an undercut portion exists, a mold for forming the product shape cannot be constituted by only two upper and lower parts. To overcome this problem, a part called a slide core is employed.

FIG. 37 shows a mold using a slide core, by way of example. As shown in the figure, when an undercut portion exists, the mold includes a slide core 340 in addition to a core-side part 320, and a cavity-side part 330. The cavity-side part 330 is formed with a groove 331 for fitting the slide core 340 therein. After the core-side part 320 and the cavity-side part 330 have been put together, the slide core 340 is fit in the groove 331 of the cavity-side part 330, and in this state, a molten material is injected into the mold and allowed to set or cure. Then, by vertically setting apart the core-side part 320 and the cavity-side part 330, and drawing out the slide core 340 in a direction indicated by an arrow in the figure, the molded article can be removed.

As described hereinabove, by using a slide core, it is possible to remove a molded article even if the product has an undercut portion. However, the use of a lot of slide cores increases the number of parts of a mold, and complicates the process of manufacturing the product, resulting in degraded productivity. To eliminate the inconvenience, in designing a mold, parting lines are determined such that as few undercut portions as possible are produced.

However, when the shape of a product becomes intricate, it becomes very difficult for the user of the CAD system to designate parting lines with accuracy.

FIG. 38 shows a two-dimensional representation of a product shape, as appearing on a display screen in which the product shape 410 is shown as viewed from the direction of the Z axis (mold opening direction). Although in this screen, the outermost periphery of the product shape can be discriminated, it often happens that there are a plurality of edges on the outermost periphery of a product shape. Therefore, in order to designate a parting line, it is required to select one of the edges located on the outermost periphery. Therefore, it is necessary to display shapes of the product as viewed from the directions of an X axis and a Y axis on the screen.

FIG. 39 shows a lower right portion of the FIG. 38 product shape as viewed in the direction of the Y axis indicated by an arrow in FIG. 38. In this figure, it is possible to distinguish edges from each other which overlap in the FIG. 38 screen. From this view, however, it is impossible to discriminate which edge is located on the outermost periphery of the product shape.

As described above, when a product shape is displayed based on two-dimensional CAD data, it is difficult for the user to designate a parting line without an error.

FIG. 40 shows a three-dimensionally displayed product shape. As shown in the figure, if a product shape 420 is three-dimensionally displayed, the product can be recognized stereoscopically. Therefore, to designate a parting line, a portion 421 corresponding to a corner of the product shape 420 is enlarged.

FIG. 41 shows part of the FIG. 40 product shape on enlarged scale. If the product shape is enlarged as shown in the figure, it becomes easy to designate an edge which should be set to a parting line. In this screen, however, it is difficult to accurately determine which edge belongs to the outermost periphery. That is, when there is only a slight displacement between the outermost edge and the other edges, it is impossible to accurately determine which edge is the outermost one.

Therefore, even if a product shape is three-dimensionally displayed, it is difficult for the user to designate a parting line with accuracy.

As will be understood from the discussion stated above, the conventional mold design method tends to give rise to designation of wrong parting lines, and demands a very time-consuming work for the designation. Moreover, with diversification of designs and complication of product shapes as well as frequent model changes of products, in recent years, there is a demand of shorter delivery dates of mold designs. To meet the demand, it is necessary to simplify and speed up the process of mold design, and thereby allow molds to be designed smoothly.

SUMMARY OF THE INVENTION

The present invention has been made in view of the above circumstances, and an object thereof is to provide a mold design system which is capable of promptly determining a parting line with accuracy.

Further, another object of the invention is to provide a computer-readable recording medium which stores a mold design program capable of causing a computer to rapidly determine a parting line with accuracy.

To solve the above problems, the present invention provides a mold design system for designing a mold for use in molding a product, the mold design system comprising two-dimensional projection means for producing two-dimensional projection data by projecting edges of a product shape represented by three-dimensional graphic data onto a plane perpendicular to a mold opening direction, and parting line determination means for sequentially determining, out of candidate edges contiguous to a determined parting line already determined as parting line, a candidate edge forming a largest interior angle with the determined parting line at a contact point therewith on the two-dimensional projection data, as the parting line, whereby a parting line of the mold for molding the product shape is determined.

According to this mold design system, edges of a product shape represented by three-dimensional graphic data are projected by the two-dimensional projection means onto a plane perpendicular to a mold opening direction, whereby two-dimensional projection data is generated. Then, the parting line determination means sequentially determines, from candidate edges contiguous to a determined parting line already determined as parting line, a candidate edge forming a largest interior angle with the determined parting line at a contact point therewith on the two-dimensional projection data, as the parting line, whereby a parting line of the mold for molding the product shape is determined.

Further, to solve the above problems, the present invention provides a computer-readable recording medium which stores a mold design program for use in designing a mold for molding a product, the program being characterized by causing a computer to function as two-dimensional projection means for producing two-dimensional projection data by projecting edges of a product shape represented by three-dimensional graphic data onto a plane perpendicular to a mold opening direction, and parting line determination means for sequentially determining, from candidate edges contiguous to a determined parting line already determined as parting line, a candidate edge forming a largest interior angle with the determined parting line at a contact point therewith on the two-dimensional projection data, as the parting line, whereby a parting line of the mold for molding the product shape is determined.

If the mold design program stored in the computer-readable recording medium is executed by a computer, functions required for the mold design system according to the present invention can be installed on the computer.

The above and other objects, features and advantages of the present invention will become apparent from the following description when taken in conjunction with the accompanying drawings which illustrate preferred embodiments of the present invention by way of example.

BRIEF DESCRIPTION OF DRAWINGS

FIG. 39 is a diagram showing a lower right portion of the FIG. 38 product shape as viewed from the direction of a Y axis indicated by an arrow in FIG. 38;

DESCRIPTION OF THE PREFERRED EMBODIMENTS

The present invention will now be described below with reference to the accompanying drawings.

Figure 1:
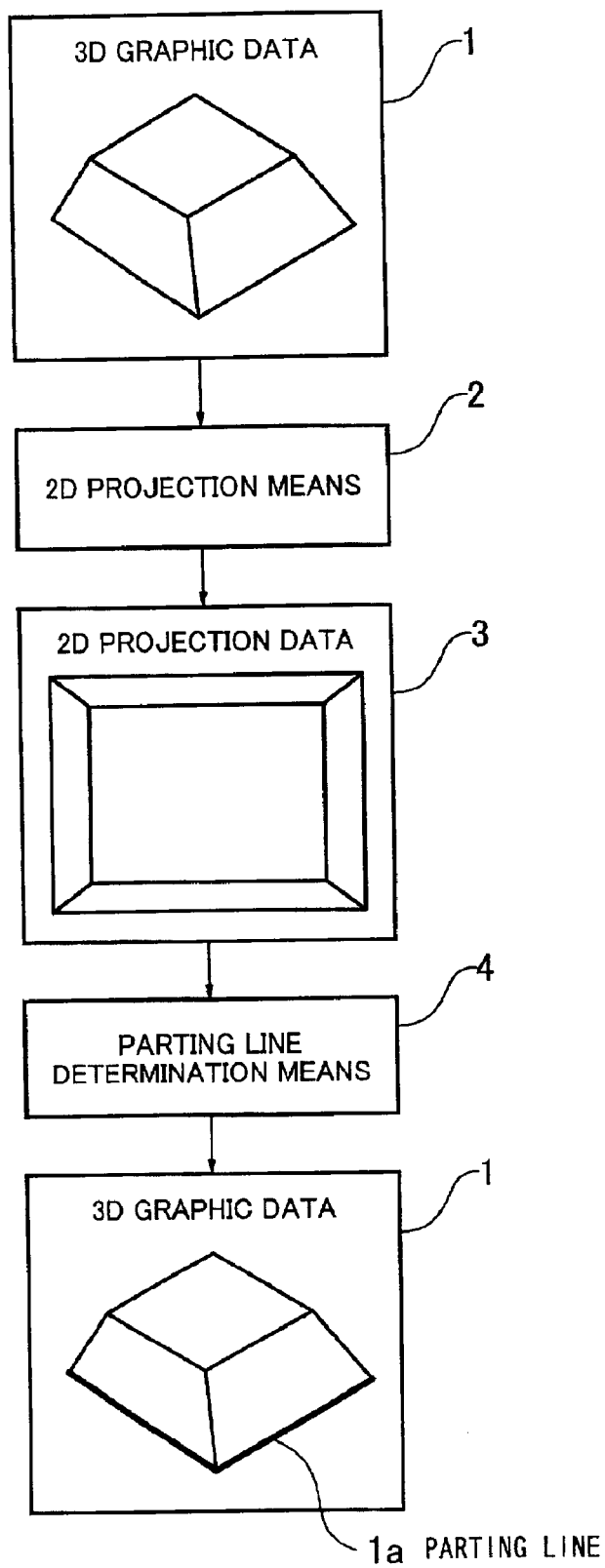
FIG. 1 is a diagram illustrating principles of the present invention.

FIG. 1 illustrates the principles of the invention. First, a product shape is presented in three-dimensional graphic data 1. The three-dimensional graphic data 1 represents the product shape by faces and edges. Plane projection means 2 projects the edges of the product shape represented by the three-dimensional graphic data 1 onto a plane perpendicular to a mold opening direction, thereby forming two-dimensional projection data 3.

After the two-dimensional projection data 3 is formed, parting line determination means 4 sequentially determines, from candidate edges contiguous to a determined parting line already determined as parting line, a candidate edge forming a largest interior angle with the determined parting line at a contact point therewith on the two-dimensional projection data, as parting line. This determines the parting line 1a of a mold for forming the product shape represented by the three-dimensional graphic data 1. It should be noted that when the determined parting line and a candidate edge are each formed by a curved line, an interior angle therebetween is defined as an angle between tangents touching the parting line and the candidate edge, respectively, at a contact point between the parting line and the candidate edge.

If the parting line is determined by the above-mentioned mold design system, edges forming the largest interior angle with the parting line determined in advance are sequentially determined as parting line, so that the outermost peripheral edges which are located along the outermost periphery of the product shape when the three-dimensional graphic data 1 is viewed from the mold opening direction are automatically determined as parting line. Consequently, the parting line can be promptly determined with accuracy.

Next, a hardware configuration of a CAD system having functions of the mold design system according to the invention will be described.

Figure 2:
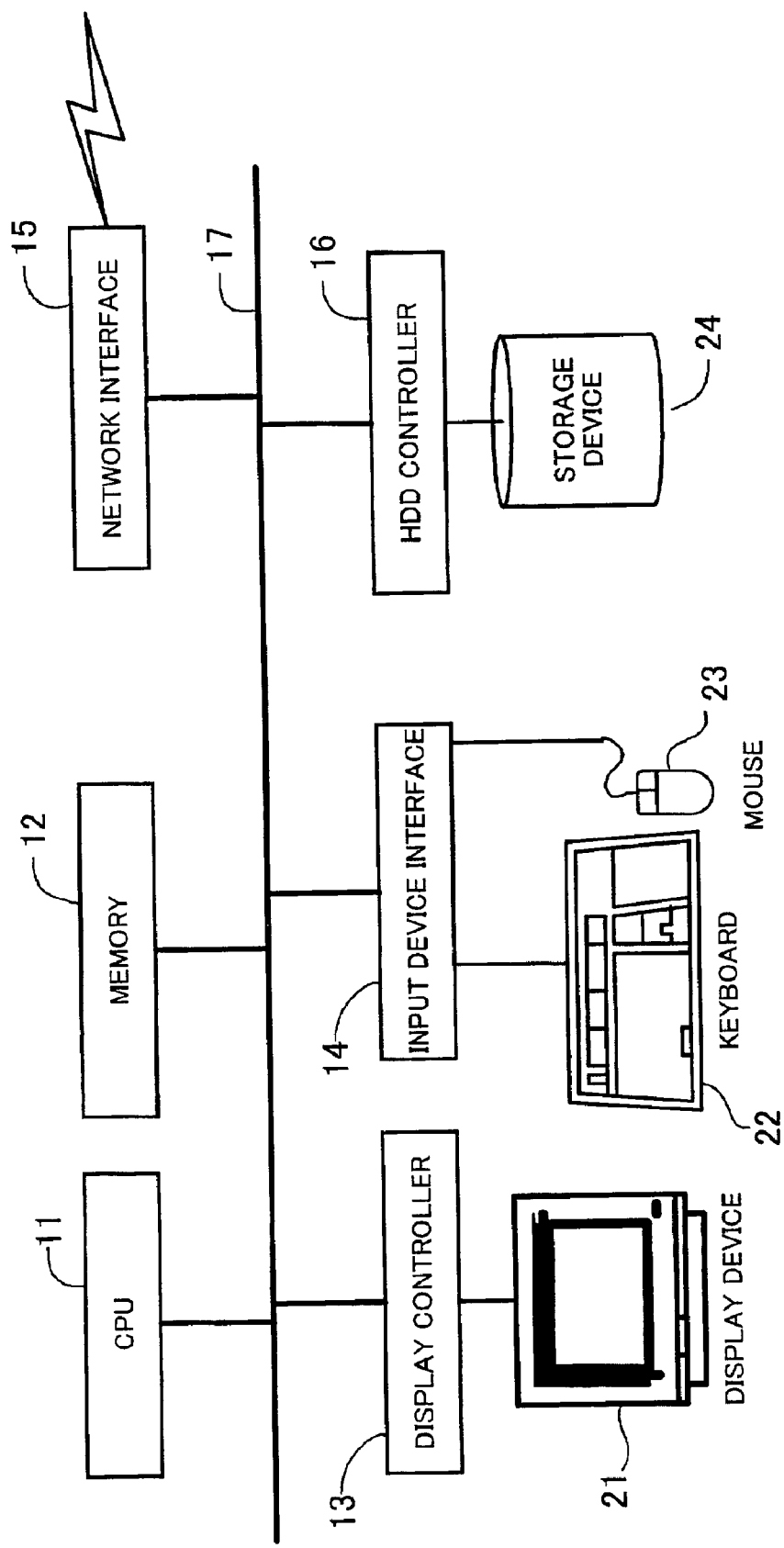
FIG. 2 is a diagram of a hardware configuration of a CAD system for carrying out the present invention.

FIG. 2 illustrates the hardware configuration of the CAD system for carrying out the present invention. The CAD has a configuration including a CPU (Central Processing Unit) 11 as its principal element. The CPU 11 performs calculations for determining parting lines and for designing a mold in accordance with programs stored in a memory 12, and also controls various devices connected thereto via a bus 17. Peripheral devices connected to the bus 17 includes the below-mentioned devices.

A display controller 13 generates a display image in accordance with a draw instruction supplied thereto from the CPU 11, and outputs the generated display image to a display device 21 connected thereto. In accordance with the display image information supplied from the display controller 13, the display device 21 displays the image on its screen.

An input device interface 14, to which a keyboard 22 and a mouse 23 are connected, transfers input signals from the keyboard 22 and the mouse 23 to the CPU 11.

A network interface 15, which is connected to a LAN (Local Area Network), controls data communications through the LAN. Specifically, the network interface 15 transfers data supplied thereto from the CPU 11 to other devices on the LAN; it also receives data transmitted via the LAN and supplies the received data to the CPU 11.

An HDD (Hard Disk Drive) controller 16, to which a storage device 24 such as a hard disk unit is connected, controls the input/output of data to/from the storage device 24. The storage device 24 stores programs to be carried out by the CPU 11, such as system programs and a CAD program including a mold design program, as well as three-dimensional CAD data.

In the system as described above, the CAD program is executed by the CPU 11, whereupon the computer operates as a CAD system having the function of the mold design system according to the invention. The processing function accomplished in this way by the CAD system will be described below.

Figure 3:
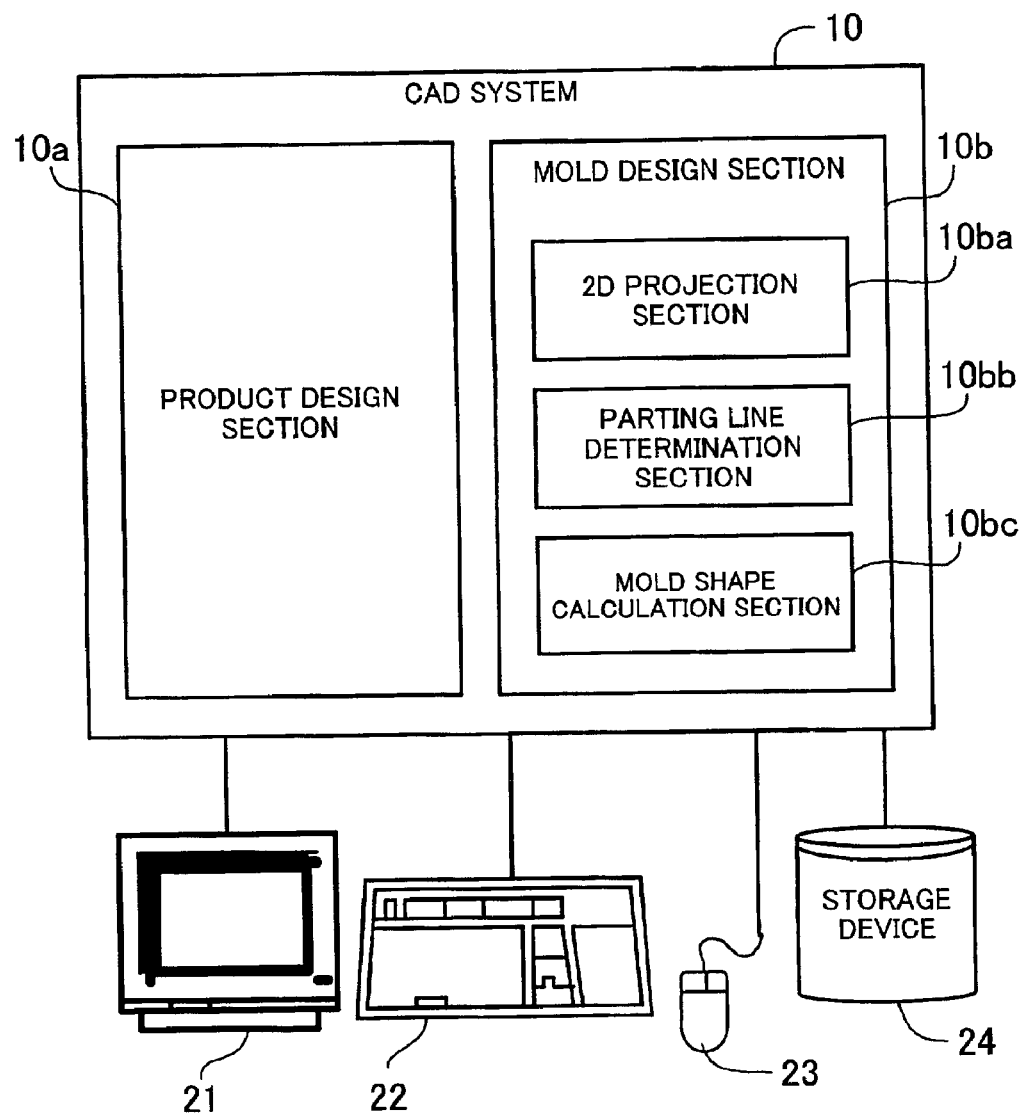
FIG. 3 is a block diagram illustrating processing functions of the CAD system.

FIG. 3 is a block diagram illustrating processing functions of the CAD system. The functions of the CAD system 10 are largely classified into a product design section 10a for creating three-dimensional CAD data of a product, and a mold design section 10b for creating three-dimensional CAD data of a mold based on the three-dimensional CAD data of the product. Further, the mold design section 10b includes a two-dimensional projection section 10ba for projecting three-dimensional CAD data onto a plane, a parting line determination section 10bb for determining parting lines based on a shape projected onto the plane, and a mold shape calculation section 10bc for generating CAD data of a mold shape based on the three-dimensional CAD data and data of the parting lines.

The designer inputs instructions by using input devices, such as the keyboard 22 and the mouse 23, thereby designing a product shape by means of the function of the product design section 10a. The designed product shape is stored in the storage device 24 as three-dimensional CAD data. The three-dimensional CAD data produced by the product design section 10a is comprised of a plurality of face elements, and intersecting lines between faces are edge elements.

Figure 4:
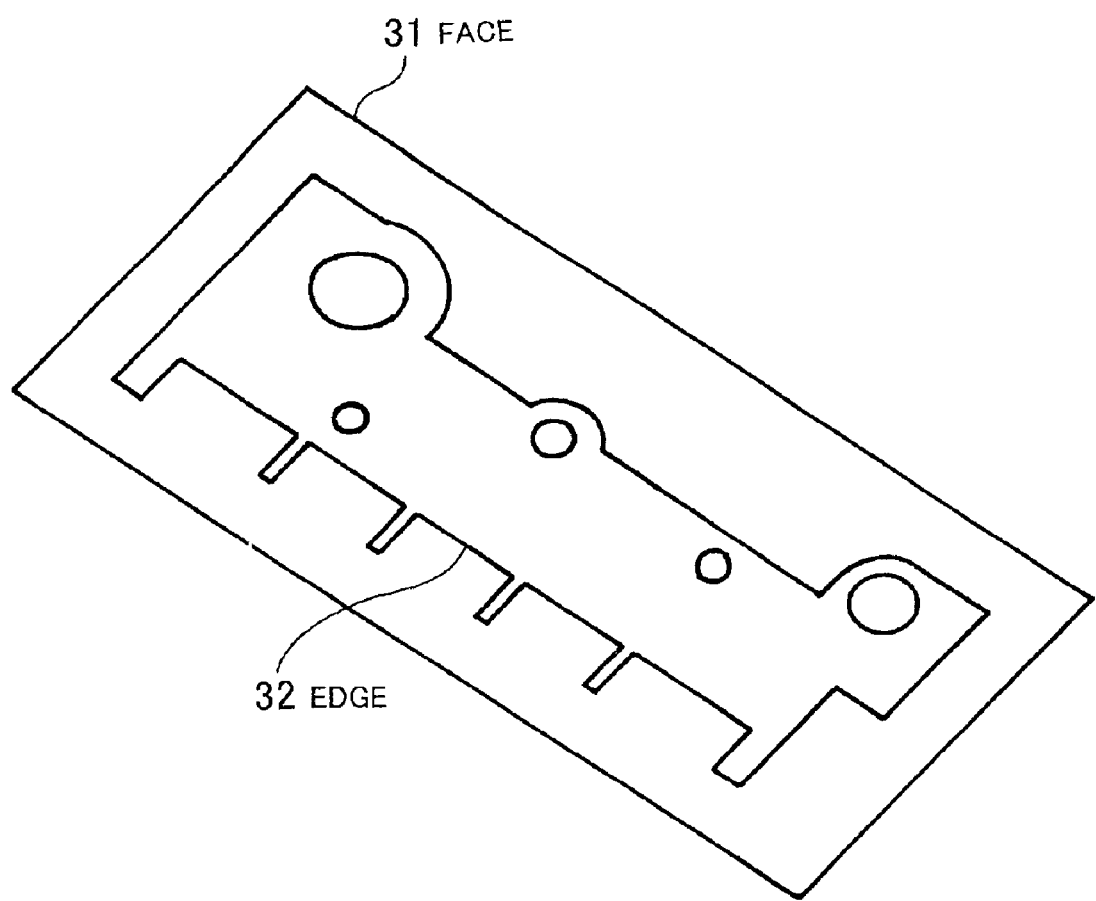
FIG. 4 is a diagram showing a data structure of one face of three-dimensional CAD data.

FIG. 4 shows a data structure of one face of the three-dimensional CAD data. In the figure, the shape of an outer frame indicated by a thin line represents a face 31, which is a curved surface or a plane in a three-dimensional space. A thick line within the face 31 indicates an edge 32, which is a curved line or a straight line in the three-dimensional space. As described above, data for defining one face is comprised of face data of one face, and edge data of one or more edges each forming a boundary between the one face and another. Edge data of an edge forming a boundary is shared between one face data and other face data contiguous thereto.

Figure 5:
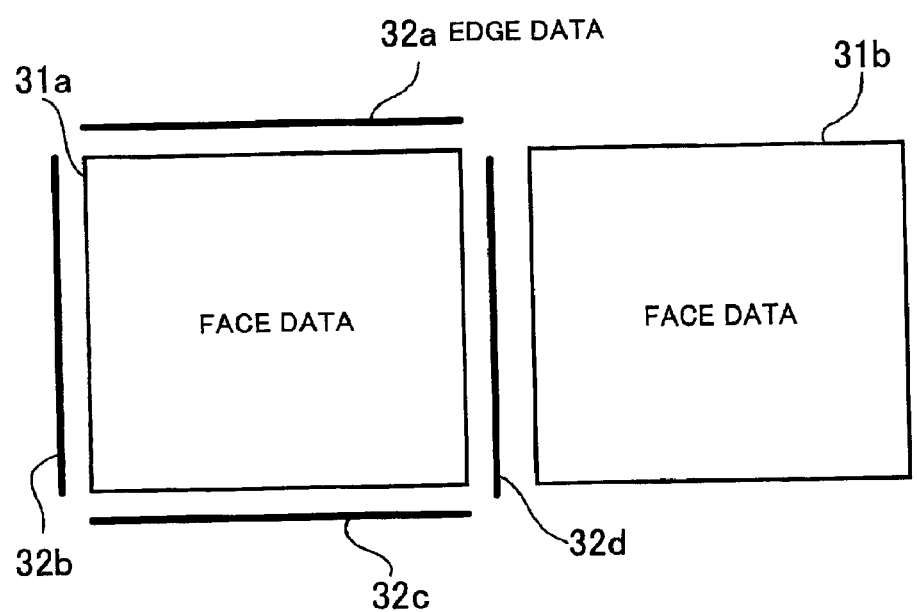
FIG. 5 is a diagram showing a relation between data items of the three-dimensional CAD data.

FIG. 5 shows a relation between data items in the three-dimensional CAD data. Data defining one face is formed by a face data item 31a and a plurality of edge data items 32a to 32d, and an edge data item 32d forming a boundary between the face data item 31a and a face data item 31b contiguous thereto is shared by the two face data items 31a, 31b.

After the three-dimensional data indicative of the product shape is generated, the designer inputs an instruction for generating a mold shape to the mold design section 10b by using the input devices. Then, an edge of the three-dimensional CAD data is projected onto a plane by the two-dimensional projection section 10ba from the mold opening direction, whereby two-dimensional data is generated.

Figure 6:
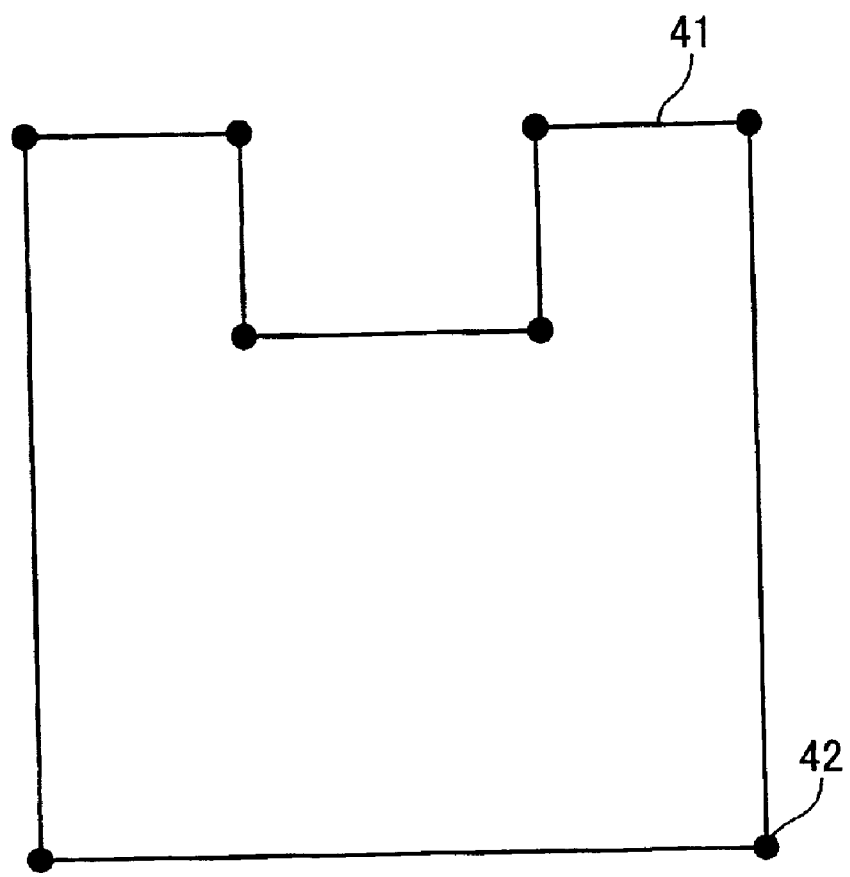
FIG. 6 is a diagram showing a data structure of two-dimensional data.

FIG. 6 shows a data structure of the two-dimensional data. The two-dimensional data is comprised of curved line data 41 and point data 42 indicative of end points of each curved line. Two-dimensional data thus formed is passed to the parting line determination section 10bb. The parting line determination section 10bb determines a parting line by using the two-dimensional data passed thereto, while being instructed by the user as required. The parting line is determined, out of edge elements of the two-dimensional data, based on the outermost periphery of the product shape.

The following shows a case in which two-dimensional data is obtained from the three-dimensional CAD data, by way of example.

Figure 7:
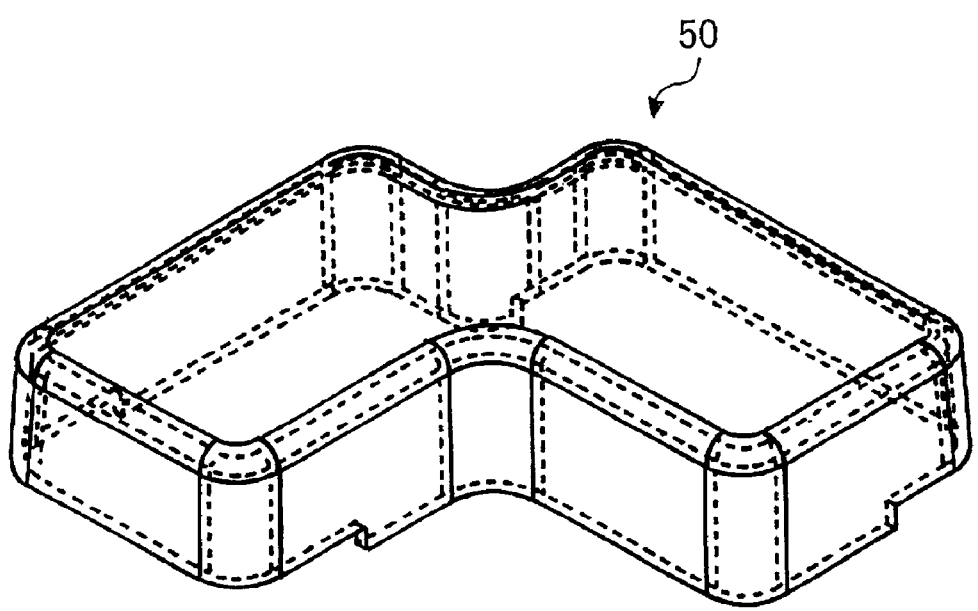
FIG. 7 is a diagram showing an example of the three-dimensional CAD data.
Figure 7:
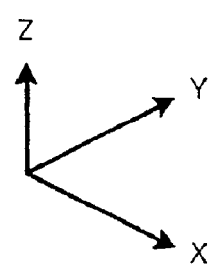

FIG. 7 shows an example of the three-dimensional CAD data. As shown in the figure, the three-dimensional CAD data representative of an actual product shape 50 is comprised of a large number of faces and edges. In the example illustrated in FIG. 7, it is assumed that the mold is opened or set apart in the Z direction. Therefore, the two-dimensional projection section 10ba projects the product shape data onto a plane perpendicular to the Z axis, thereby generating two-dimensional data.

Figure 8:
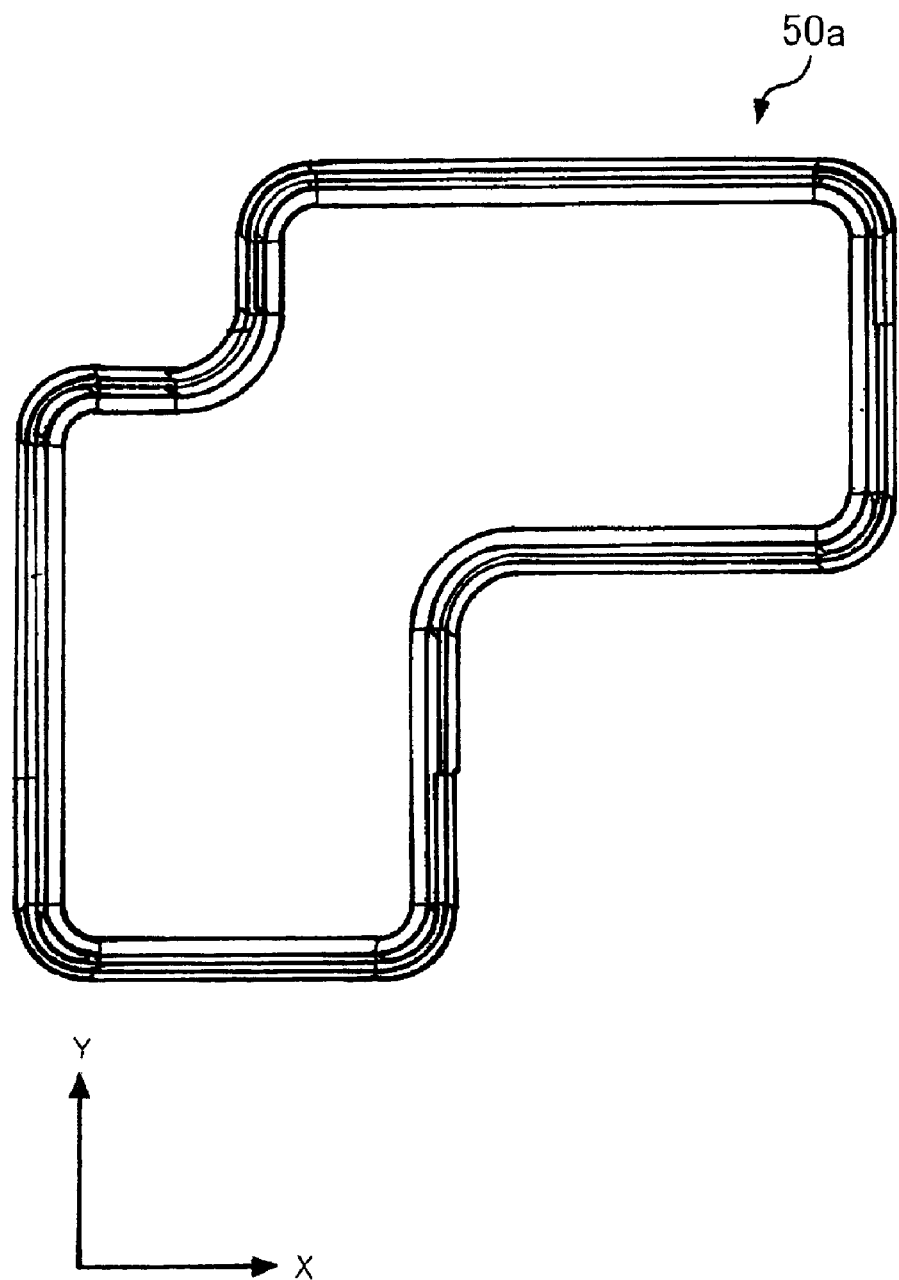
FIG. 8 is a diagram showing product shape data projected onto a plane.

FIG. 8 shows the product shape data projected onto the plane. As shown in the figure, by converting the three-dimensional CAD data to two-dimensional data 50a, it becomes easy to detect the outermost periphery of the product shape. It should be noted that in this example, the edges of the two-dimensional data 50a and those of the three-dimensional data are correlated to each other.

The generated two-dimensional data is passed to the parting line determination section 10bb by the mold design section 10b which sequentially determines edges forming the outermost periphery of a two-dimensional product shape as parting line. To this end, as a basic procedure, first, the user designates an edge which is clearly located on the outermost periphery as a first parting line. Then, the user sequentially determines an edge assumed to be located on the outermost periphery, out of edges contiguous to the determined parting line, as parting line. If the determined parting line is contiguous to the first parting line designated first, the parting line determination process is terminated.

Now, the above process for determining a parting line out of a plurality of contiguous edges will be described in more detail.

Figure 9:
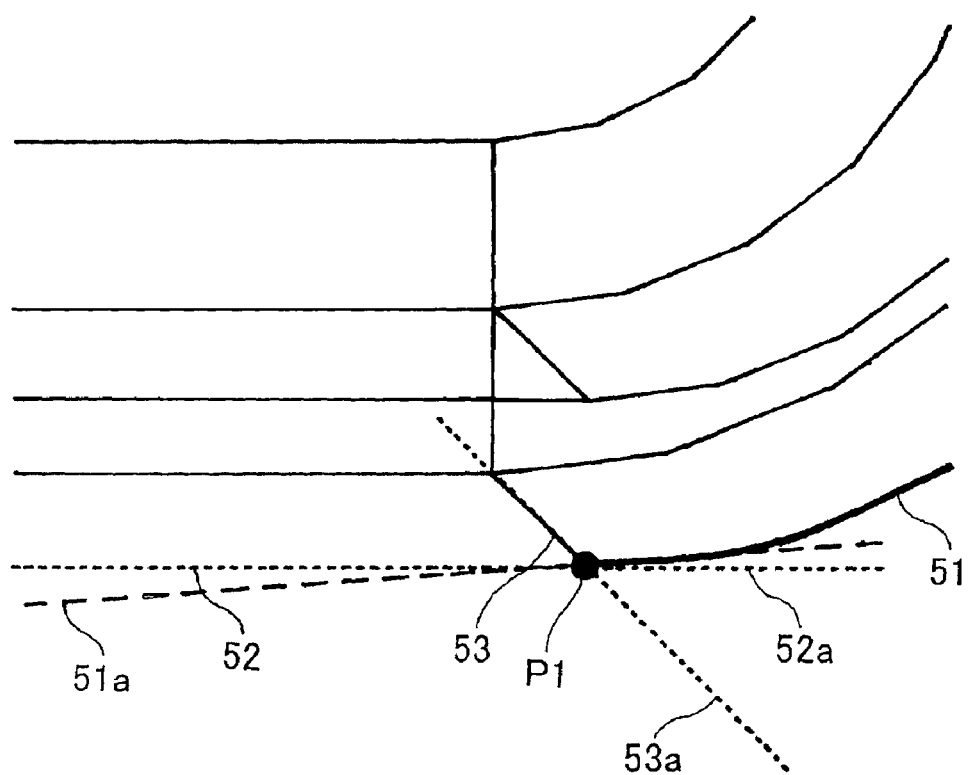
FIG. 9 is a diagram showing tangents determined at an end point of a parting line.

FIG. 9 shows tangents determined at an end point of a parting line. This figure shows part of the two-dimensional data formed by projecting the product shape on enlarged scale. At an end point P1 of the parting line 51 already determined, two contiguous edges 52, 53 exist. Therefore, a tangent 51a to the parting line 51 at the end point P1 as well as tangents 52a, 53a to the respective contiguous edges 52, 53 at the end point P1 are obtained. It should be note that throughout the specification, the term "tangent to an edge at an end point thereof" is used to mean a straight line L which, supposing that a straight line passes through a fixed point P set at the end point of the edge and a moving point Q on the edge, is infinitely approached by the straight line PQ when the moving point Q infinitely approaches the fixed point P along a curved line of the edge.

Now, an interior angle between the tangent 51a to the parting line 51 and the tangent 52a to the edge 52, and an interior angle between the tangent 51a and the tangent 53a to the edge 53 contiguous to the edge 52 are compared with each other, whereby it is determined which of the two contiguous edges 52, 53 should be determined as parting line.

Figure 10:
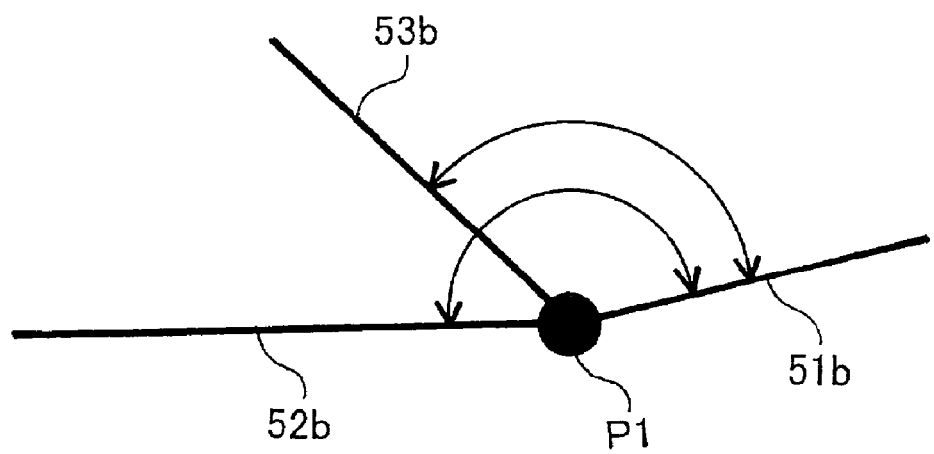
FIG. 10 is a diagram useful in explaining a method of comparing interior angles with each other.

FIG. 10 is a diagram useful in explaining a method of comparing interior angles. First, a half line 51b extending from the contact point P1 in the direction of extension of the parting line is assumed to be a half line overlapping the tangent 51a to the parting line 51. On the other hand, half lines 52b, 53b extending from the contact point P1 in the directions of existence of the respective contiguous edges 52, 53 are supposed as half lines overlapping the tangents 52a, 53a to the respective contiguous edges. Then, an angle formed between the half line 51b and the half line 52b, and an angle between the half line 51b and the half line 53b are measured. In this process, if edges to be set to a parting line are being detected clockwise along the outermost periphery of the product shape, counterclockwise angles from the half line 51b to the half lines 52b, 53b form interior angles. Inversely, if edges to be set to a parting line are being detected counterclockwise along the outermost periphery of the product shape, clockwise angles from the half line 51b to the half lines 52b, 53b form interior angles.

In the illustrated example, edges to be set to a parting line are being detected clockwise along the outermost periphery of the product shape, and hence the product exists above the half line 51b in the figure. Therefore, counterclockwise angles (interior angles) from the half line 51b to the other half lines 52b, 53b are measured. As a result of the measurement, it is known that the angle between the half line 51b and the half line 52b is larger. Hence, in this example, the contiguous edge 52 corresponding to the half line 52b is specified as parting line.

After determining a parting line that goes round the outermost periphery of the product shape, a set of data of edges forming the parting line, and the three-dimensional CAD data is passed to the mold shape calculation section 10bc. The mold shape calculation section 10bc generates three-dimensional CAD data of a mold for forming the product based on the three-dimensional CAD data and data of the parting line. The generated three-dimensional CAD data of the mold shape is stored in the storage device 24.

Thus, the mold for forming the product is designed.

Next, process steps for determining a parting line will be described in detail.

Figure 11:
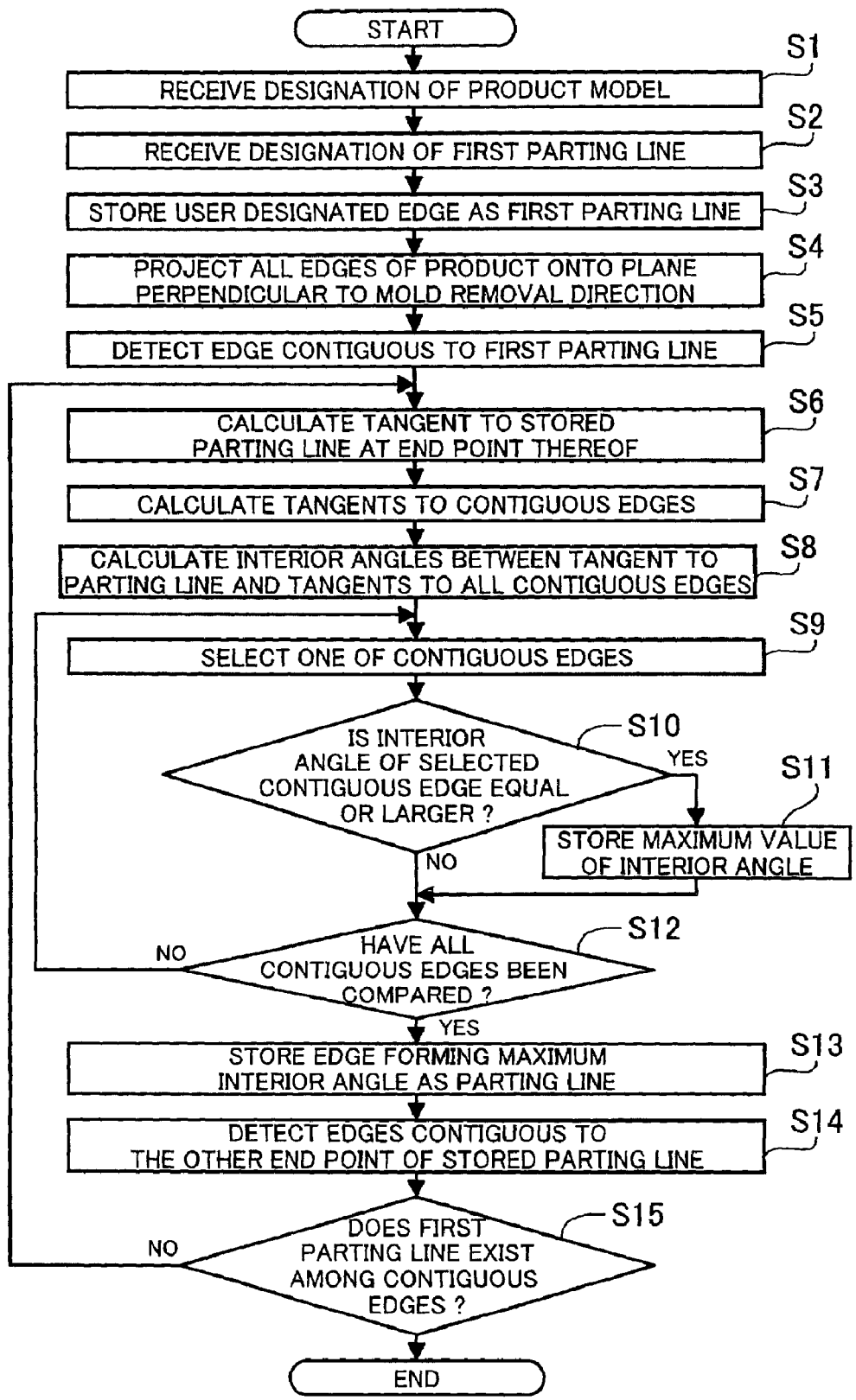
FIG. 11 is a flowchart showing a flow of steps of a parting line determination process.

FIG. 11 is a flowchart showing a flow of a parting line determination process. The process will be described hereafter according to the order of steps.

[S1] The mold design section 10b prompts the user to designate product shape data for determining a parting line.

[S2] The mold design section 10b prompts the user to designate an edge which is used as a starting point for calculating the parting line.

[S3] The mold design section 10b stores the edge designated by the user as a first parting line for use in subsequent process step.

[S4] The mold design section 10b passes the three-dimensional CAD data designated at the step S1 to the two-dimensional projection section 10ba. Then, the two-dimensional projection section 10ba projects the edges of a product onto a plane perpendicular to the direction of removal of a mold. The projected figure thus generated is passed to the parting line determination section 10bb.

[S5] The parting line determination section 10bb selects one end point of the projected edge of the first parting line, and detects another edge contiguous to the end point selected.

[S6] The parting line determination section 10bb calculates a tangent to the parting line stored at the step S3 or a step S13 at the end point of the contiguous edge. The end point where the tangent is calculated is the end point selected at the step S5 when only the first parting line is stored. If it is after a contiguous edge is stored at the step S13, the end point where the tangent is calculated is the other end point (which is not connected to the parting line) of the contiguous edge stored.

[S7] The parting line determination section 10bb calculates tangents to all the contiguous edges at the end point contiguous to the parting line.

[S8] The parting line determination section 10bb calculates interior angles between the tangent to the parting line and all the contiguous edges.

[S9] The parting line determination section 10bb selects one of the contiguous edges whose interior angles are not compared with each other.

[S10] The parting line determination section 10bb compares the maximum value (initial value is "0") of values of already stored interior angles with the value of the interior angle of the contiguous edge selected at the step S9. If the interior angle of the contiguous edge selected at the step S9 is equal to or larger than the maximum value already stored, the program proceeds to a step S11. If not, the program proceeds to a step S12.

[S11] The parting line determination section 10bb stores the value of the interior angle of the contiguous edge selected at the step S9 as the value of the maximum interior angle.

[S12] The parting line determination section 10bb determines whether or not the interior angles of all the contiguous edges have been compared with each other. If the interior angles of all the contiguous edges have been compared with each other, the program proceeds to a step S13. If not, the program proceeds to the step S9.

[S13] The parting line determination section 10bb carries out the processes at the steps S9 to S12 to thereby store a contiguous edge having the maximum interior angle as parting line.

[S14] The parting line determination section 10bb calculates edges contiguous to the parting line determined at the step S13 in order to calculate a next parting line.

[S15] The parting line determination section 10bb determines whether or not the edge which is the first parting line stored at the step S3 exists among the contiguous edges. The parting lines are located along the outermost periphery of the product, and at the same time form one loop, so that if it is determined at the step S15 that the edge which is the first parting line exists, the parting line determination process is terminated since it is determined that all the parting lines are finally determined (the loop is completed). If the first parting line does not exist as a contiguous edge, it is determined that all the parting lines are not yet finally determined, and the program proceeds to the step S6 to further continue the process for determining a next parting line.

Execution of the process steps described above permits automatic determination of a parting line for use in producing a mold. This makes it possible to implement an efficient design operation of a mold as well as reduce wrong operations in the course of the design operation.

In the following, applications of the present invention which exploit the above-mentioned CAD system will be described.

First, a first application is described, in which the mold design section 100b automatically selects a first parting line. In this application, a distance from the central point of a product to the middle point of each edge is calculated, and an edge whose middle point is positioned farthest from the central point of the product is determined as a starting point. Since a parting line forms the outermost periphery of the product, it is possible to set an edge which has a middle point positioned farthest from the central point of the product, to the parting line.

Figure 12:
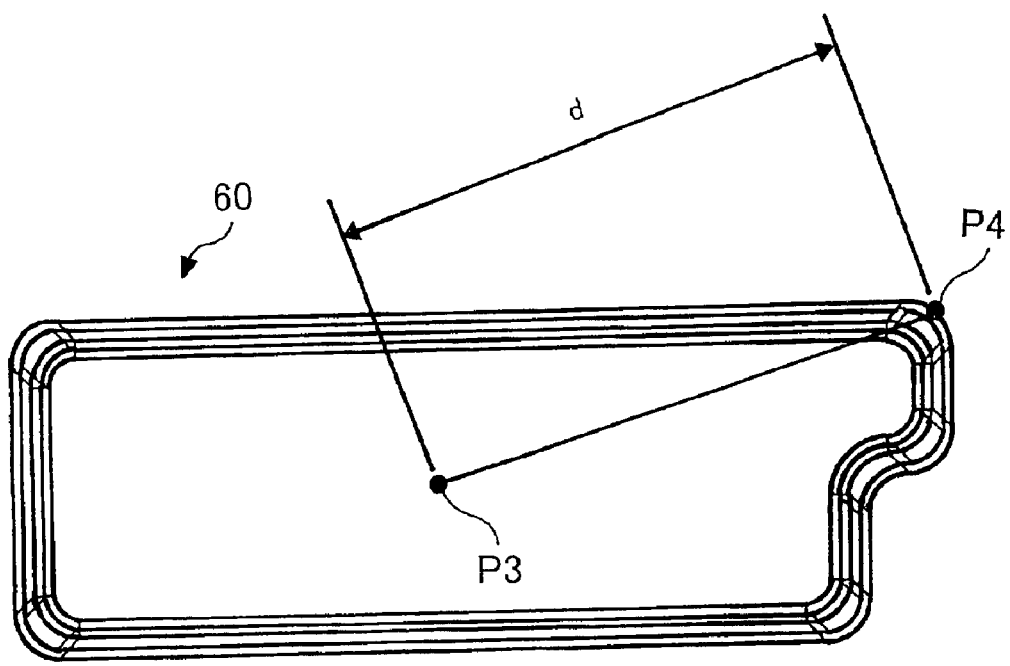
FIG. 12 is a diagram useful in explaining a method of determining a first parting line.
Figure 12:
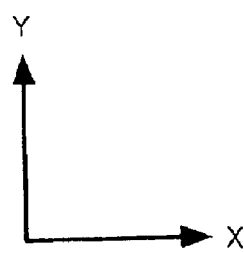

FIG. 12 is a diagram useful in explaining a method of determining a first parting line. First, the center of gravity of a product shape is calculated, and the position of the center of gravity is defined as the center P3 of a product. Then, the middle point P4 of each edge is determined to calculate a distance d from the center P3 to the middle point P4, and an edge having the largest distance d is determined as a first parting line. Now, steps which the parting line determination section 10bb carries out in effecting the above processing will be described hereinafter.

Figure 13:
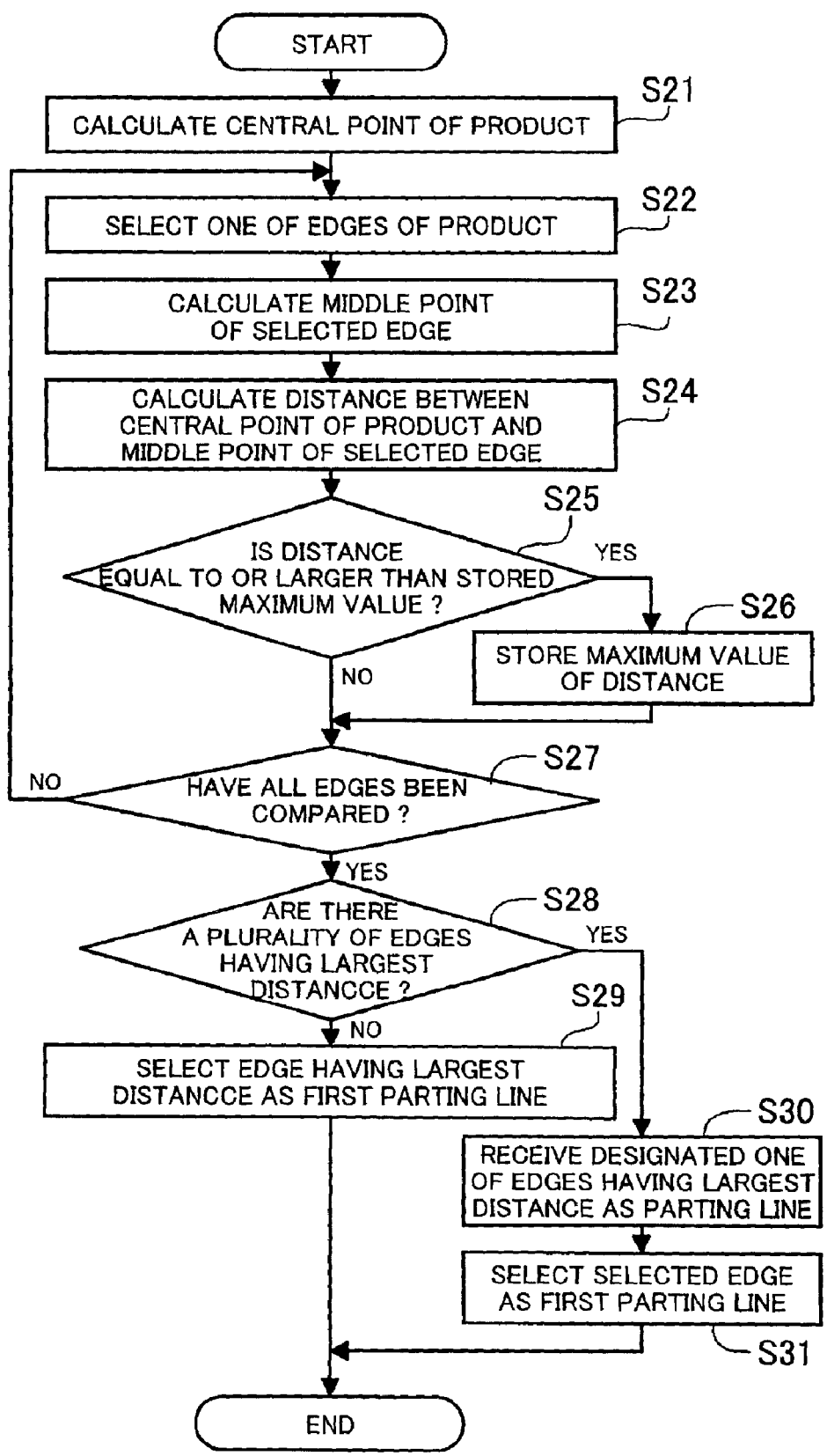
FIG. 13 is a flowchart showing process steps for calculating a first parting line.

FIG. 13 is a flowchart for a process for calculating the first parting line. All the steps in this calculation process are carried out by the parting line determination section 10bb. It should be note that in this example, if there exist a plurality of edges having the largest distance, the user is prompted to designate an edge to be set to a first parting line.

[S21] The central point of the product is calculated.

[S22] One of the edges of the product is selected.

[S23] The middle point of the selected edge is calculated.

[S24] A distance from the central point of the product to the middle point of the edge is calculated.

[S25] It is determined whether or not the value of the calculated distance is equal to or larger than the maximum value (initial value is "0") already stored. If the value of the distance calculated is equal to or larger than the maximum value, the program proceeds to a step S26, whereas if the value of the distance calculated is smaller than the maximum value, the program proceeds to a step S27.

[S26] The distance calculated at the step S24 is stored as the maximum value of values of the distances.

[S27] It is determined whether or not all the edges have been compared with each other. If all the edges have been compared with each other, the program proceeds to a step S28. If not, the program proceeds to the step S22.

[S28] It is determined whether or not there exist a plurality of edges having the largest distance. If there exist a plurality of edges, the program proceeds to a step S30. If not, the program proceeds to the step S29.

[S29] The edge having the largest distance is selected as a first parting line.

[S30] The edges having the largest distance is shown to the user, and designation of the edge to be determined as a first parting line is received. At this time, the user may designate an edge other than the edge having the largest distance.

[S31] The edge selected by the user is selected as the first parting line.

Execution of the process steps described above makes it possible to automatically determine a first parting line. As a result, it is possible to reduce instructions to be issued by the user to thereby lighten load on the user, while reducing wrong operations.

Next, a second application is described. The second application defines a method of determining a parting line when a plurality of edges contiguous to the parting line cross each other.

Figure 14:
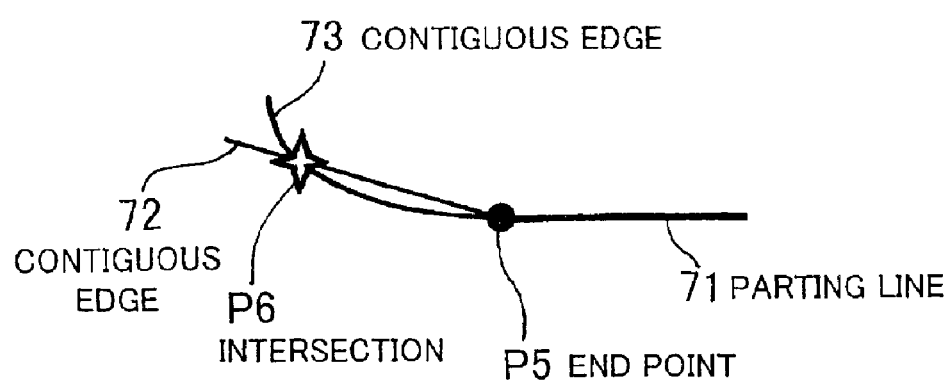
FIG. 14 is a diagram showing a status in which contiguous edges have an intersection.

FIG. 14 illustrates a status in which there exists an intersection between contiguous edges. There are two edges 72, 73 contiguous to the parting line 71 at an end point P5 thereof. In this example, let it be assumed that an edge to be set to a parting line is retrieved clockwise along the outermost peripheral profile of a product. That is, the product exists in an upper-side portion of the figure. Then, at the end point P5, the interior angle of the contiguous edge 73 is larger than that of contiguous edge 72. However, the contiguous edge 73 draws an arc toward the inside of the product, and crosses the contiguous edge 72 at an intersection P6. In this case, when positions of the other end points (end points opposite to the end point contiguous to the parting line) of the respective contiguous edges 72, 73 are compared, the other contiguous edge 72 crossing the contiguous edge 73 forming the largest interior angle should form the outermost periphery. Since it is required to determine a next parting line at the other end point of a contiguous edge set to the parting line, the contiguous edge 72 which has the other end point located on the outermost periphery is more preferable as parting line.

Further, there is also a case in which there exist two or more intersections between contiguous edges.

Figure 15:
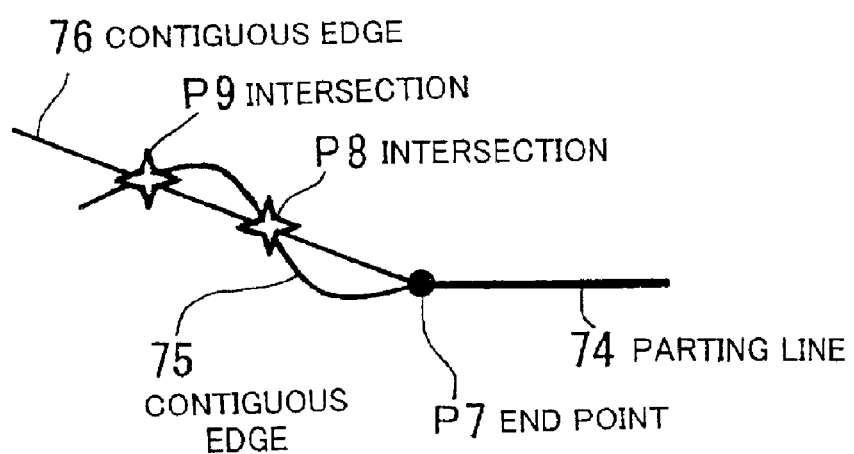
FIG. 15 is a diagram showing a status in which contiguous edges have a plurality of intersections.

FIG. 15 is a diagram showing a status in which there are a plurality of intersections between contiguous edges. In this example, similarly to FIG. 14, it is assumed that an edge to be set to a parting line is retrieved clockwise along the outermost periphery of the product shape. In this figure, at an end point P7 of the parting line 74 there are two contiguous edges 75, 76 which cross each other at a plurality of intersections P8, P9. In this case, in principle, if the number of intersections is an even number, a contiguous edge forming the largest interior angle is set to the parting line, whereas if the number of intersections is an odd number, the other contiguous edge crossing the contiguous edge forming the largest interior angle is set to the parting line. However, if there are a lot of intersections, it is difficult to automatically determine a parting line.

Figure 16:
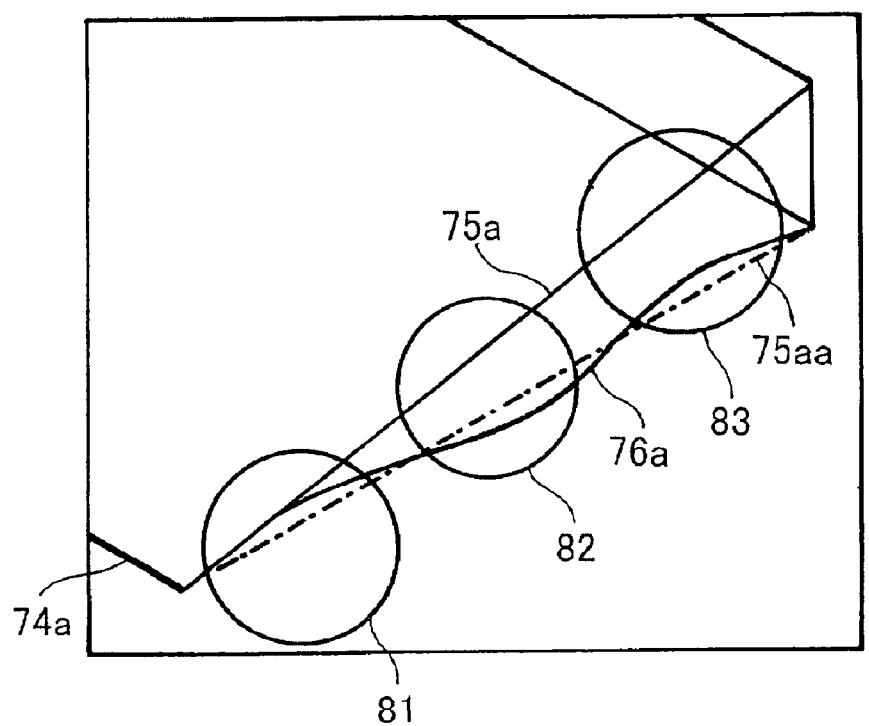
FIG. 16 is a diagram showing a three-dimensional shape in which there are a multiplicity of intersections.

FIG. 16 is a diagram showing a three-dimensional shape of the product in the case of existence of a lot of intersections. In this figure, two edges 75a, 76a are contiguous to a parting line 74a. One contiguous edge 75a is a straight line, and the other contiguous edge 76a is a wavy curved line. It should be noted that the contiguous edge 76a is assumed to be located on a plane perpendicular to the Z axis. Further, a projected edge 75aa formed by projecting the contiguous edge 75a onto the plane perpendicular to the Z axis is shown by a dotted line in the figure.

Now, if the linear contiguous edge 75a is determined as a parting line, an undercut is produced at an area 82 in the vicinity of the center of the edge. Further, if the wavy contiguous edge 76a is determined as parting line, undercuts are produced at areas 81, 83 in the vicinities of the opposite ends of the edge.

As described above, when contiguous edges cross each other a plurality of times, an undercut is produced whichever contiguous edge may be set to the parting line, which makes it difficult to cause the system to perform automatic judgment. To overcome this problem, in the second application, when contiguous edges cross each other a plurality of times, the user is prompted to designate a parting line.

Further, when contiguous edges cross each other a plurality of times, if positions of the other end points of the respective contiguous edges are compared, it is possible to presume from the number of intersections which end point is located on the outermost periphery. Therefore, when the user selects a contiguous edge, a contiguous edge whose other end point is presumed to be located on the outermost periphery is shown to the user as a preferential candidate, whereby the user is allowed to make the selection with ease.

Figure 17:
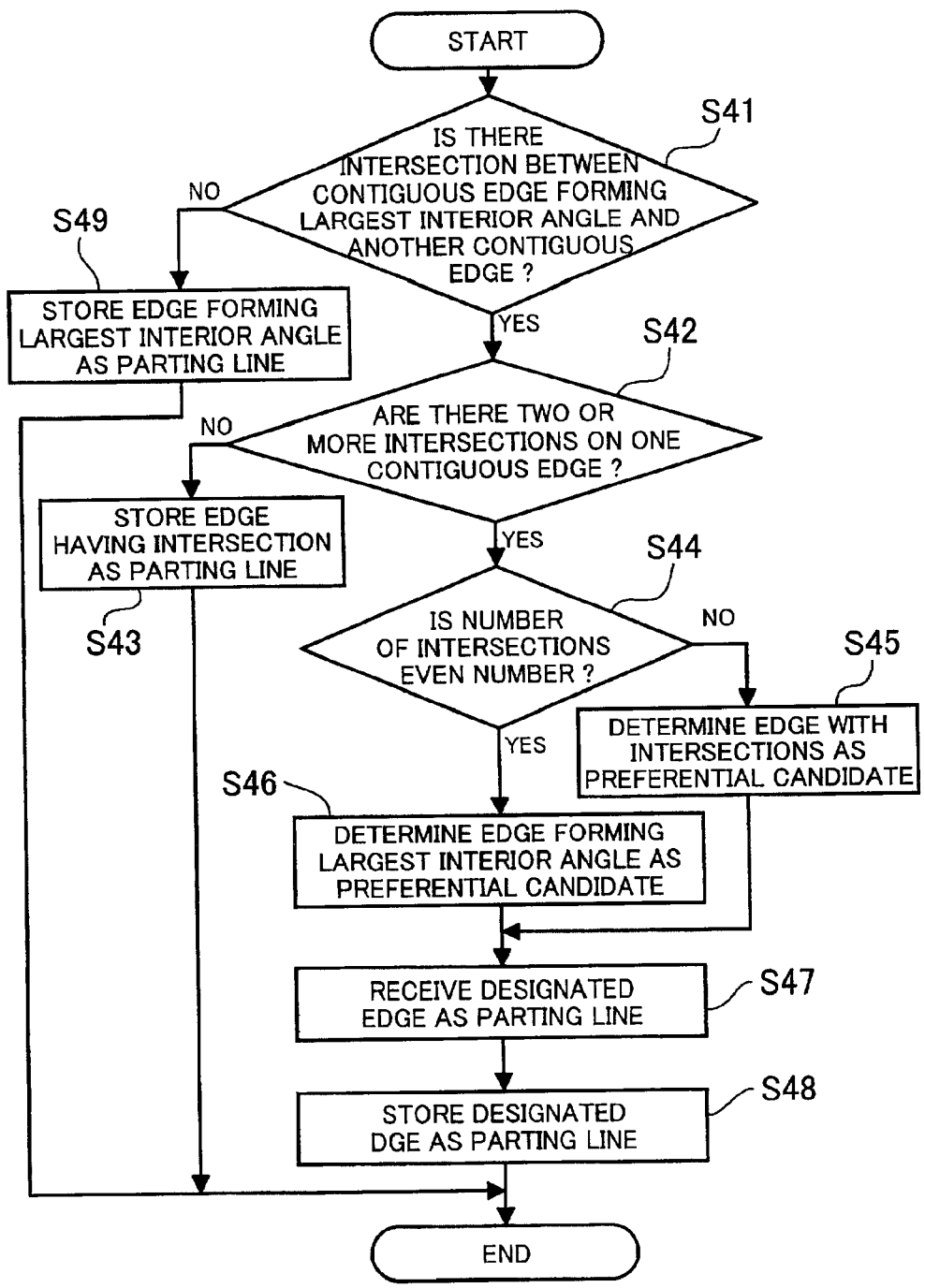
FIG. 17 is a flowchart showing process steps carried out when there are a plurality of intersections.

FIG. 17 is a flowchart showing process steps carried out when there exist a plurality of intersections between contiguous edges. This process is carried out in place of the step S13 in FIG. 11. Further, all the steps in this process are carried out by the parting line determination section 10bb.

[S41] It is determined whether or not there exists an intersection between the contiguous edge forming the largest interior angle and the other contiguous edge. When there exists an intersection therebetween, the program proceeds to a step S42, whereas when there is no intersection therebetween, the program proceeds to a step S49.

[S42] It is determined whether or not there exist two or more intersections between the contiguous edge forming the largest interior angle and one contiguous edge. When there exist two or more intersections therebetween, the program proceeds to a step S44, whereas when there is only one intersection therebetween, the program proceeds to a step S43.

[S43] When there is one intersection therebetween, the contiguous edge crossing the contiguous edge forming the largest interior angle is stored as parting line, followed by the program proceeding to the step S14 in FIG. 11.

[S44] It is determined whether or not the number of intersections is an even number. If it is an even number, the program proceeds to a step S46, whereas if it is an odd number, the program proceeds to a step S45.

[S45] The contiguous edge crossing the contiguous edge forming the largest interior angle is set to a preferential candidate, followed by the program proceeding to a step S47.

[S46] The contiguous edge forming the largest interior angle is set to a preferential candidate.

[S47] The contiguous edge forming the largest interior angle and the contiguous edge crossing the contiguous edge forming the largest interior angle are shown to the user, and which contiguous edge is a preferential candidate is shown, for receiving designation of a parting line by the user.

[S48] The edge designated by the user is stored as parting line, followed by the program proceeding to the step S14 in FIG. 11.

[S49] The contiguous edge forming the largest interior angle is stored as parting line, followed by the program proceeding to the step S14 in FIG. 11.

Execution of the above process steps makes it possible to enhance the accuracy of automatic calculation of a parting line. That is, the edge to be determined as parting line can be changed according to the number of intersections. As a result, it is possible to increase the accuracy of automatic calculation of a parting line, thereby reducing the number of portions of the parting line to be corrected by the user. This makes it possible to enhance efficiency of mold design operation time.

Next, a third application will be described, which additionally includes a process for detecting which edge should be determined as parting line, when there exist a plurality of edges forming the largest interior angle among edges contiguous to an end point of the parting line.

Figure 18:
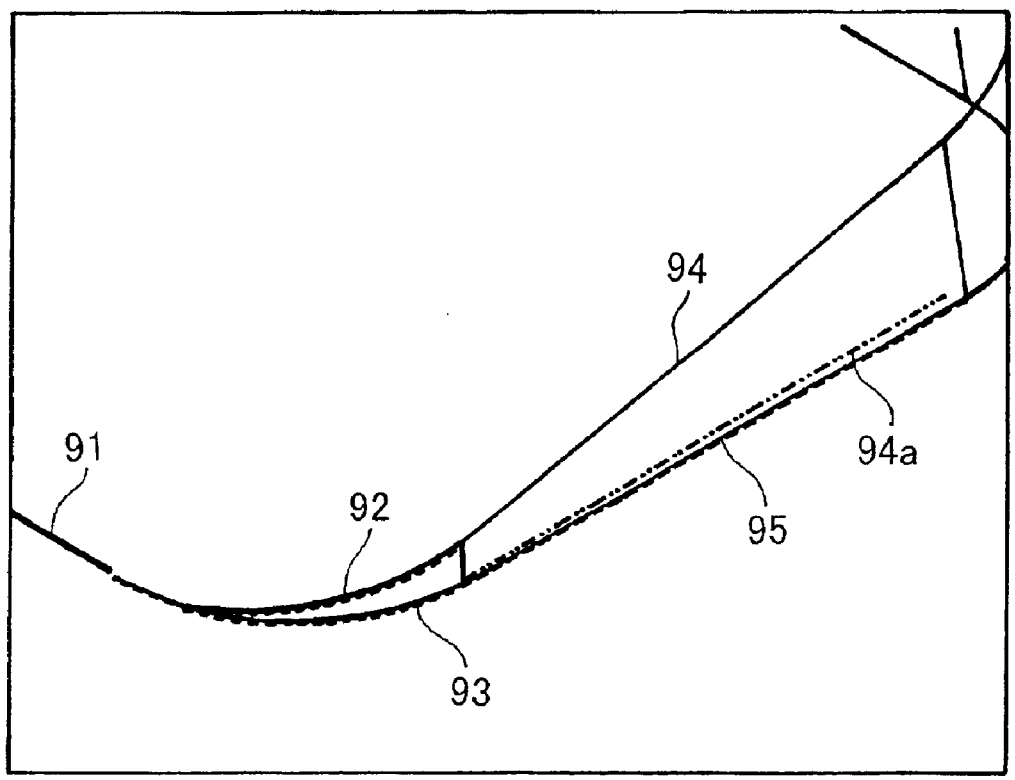
FIG. 18 is a diagram useful in explaining a status in which contiguous edges have an identical interior angle.
Figure 18:
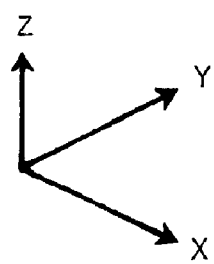

FIG. 18 is a diagram useful in explaining a status in which a plurality of contiguous edges have an identical interior angle. In this figure, two contiguous edges 92, 93 are contiguous to a parting line 91. One contiguous edge 92 is a curved line having a predetermined inclination with respect to a plane perpendicular to the Z axis, while the other contiguous edge 93 is a curved line on the plane perpendicular to the Z axis. The two contiguous edges 92, 93 are tangent to the parting line 91 at the same interior angle. In such a case, it is difficult to determine which contiguous edge should be set as parting line if only the two contiguous edges 92, 93 are compared with each other. Therefore, in the third application, edges 94, 95 contiguous to the other end points of the two contiguous edges 92, 93 are compared with each other, and an interior angle between tangents to the edges 94, 95 and a tangent to the parting line are calculated for comparison therebetween, and one of the contiguous edges 92, 93, which forms the largest interior angle at this time, is determined as parting line.

In the example illustrated in FIG. 18, a projected edge 94*a* formed by projecting the edge 94 next to the contiguous edge 92 onto the plane perpendicular to the Z axis is shown by a dotted line in the figure. When this projected edge 94*a* and the edge 95 are compared with each other, it is known that a tangent to the edge 95 has a larger interior angle between the same and the tangent to the parting line 91. Therefore, the contiguous edge 93 is determined as parting line.

In the following, steps for carrying out the above processing are described.

Figure 19:
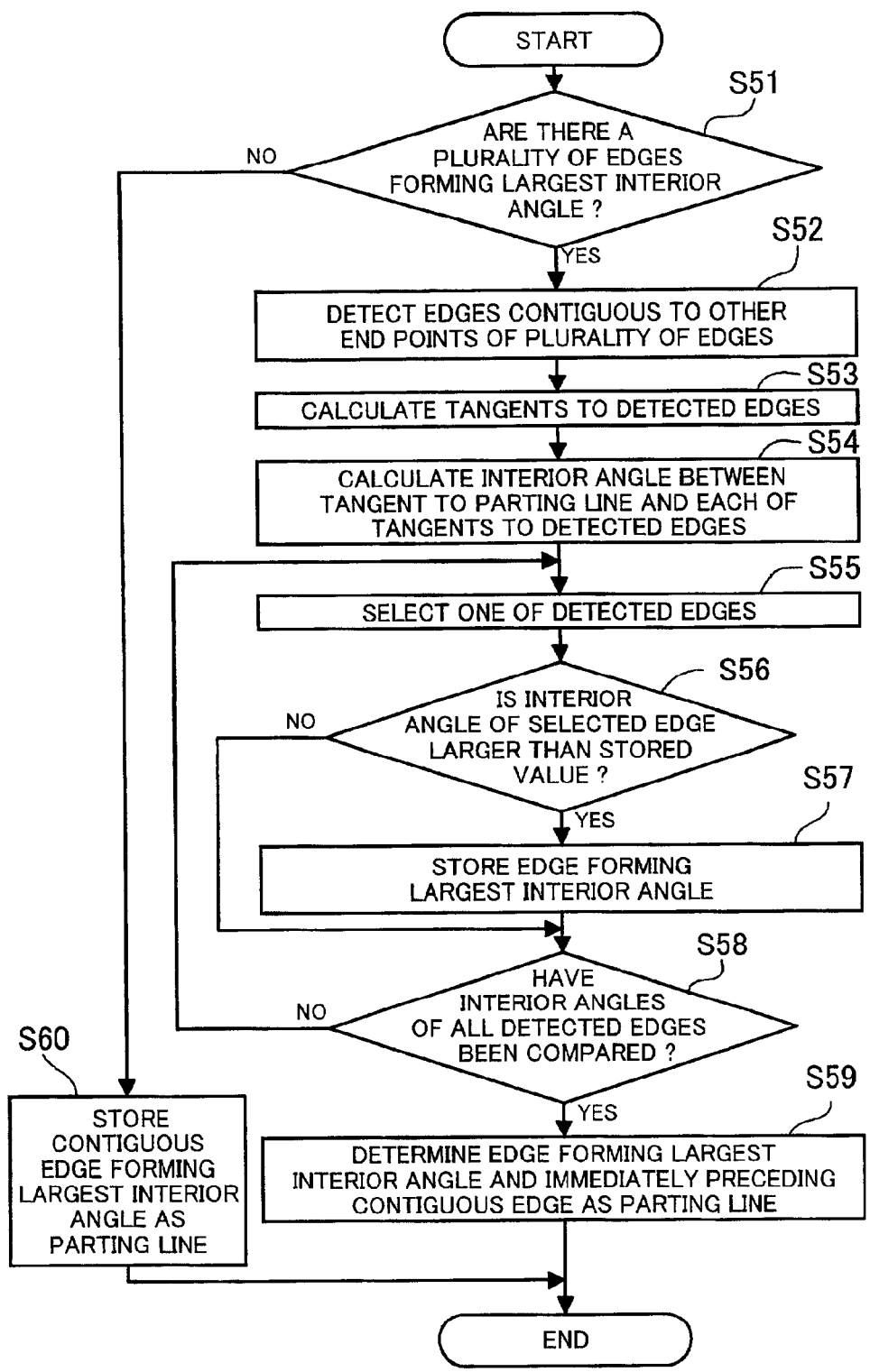
FIG. 19 is a flowchart showing process steps carried out when there are a plurality of contiguous edges forming the largest interior angle.

FIG. 19 is a flowchart showing process steps carried out when there exist a plurality of contiguous edges forming the largest interior angle. This process is carried out in place of the step S13 in FIG. 11. Further, all the steps in this process are carried out by the parting line determination section 10*bb*.

[S51] It is determined whether or not there exist a plurality of contiguous edges forming the largest interior angle. If there exist a plurality of contiguous edges, the program proceeds to a step S52, whereas if not, the program proceeds to a step S60.

[S52] When there exist a plurality of contiguous edges forming the largest interior angle, edges contiguous to the other end points of the edges are detected.

[S53] Tangents to the edges detected at the step S52 are calculated.

[S54] An interior angle between a tangent to each of the edges detected at the step S52 and the tangent to the parting line is calculated.

[S55] One of the edges detected at the step S52 is selected.

[S56] It is determined whether or not the interior angle detected as to the edge selected at the step S55, at the step S54, is equal to or larger than the value (initial value is "0") already stored. If the interior angle is equal to or larger than the value already stored, the program proceeds to a step S57, whereas if not, the program proceeds to a step S58.

[S57] The edge selected at the step S55 is stored with the value of the interior angle of the edge.

[S58] It is determined whether or not the interior angles of all the edges detected at the step S52 have been compared with each other. If the interior angles of all the edges have been compared with each other, the program proceeds to a step S59, whereas if not, the program proceeds to the step S55.

[S59] The edge forming the largest interior angle and a contiguous edge immediately preceding the edge are determined as parting line, followed by the program proceeding to the step S14 in FIG. 11.

[S60] When there is only one contiguous edge which forms the largest interior angle, the contiguous edge forming the largest interior angle is determined as parting line, then the program proceeds to the step S14 in FIG. 11.

Execution of the process steps described above, it becomes possible to further enhance the accuracy of automatic calculation of a parting line.

Next, a fourth application will be described. The fourth application defines a process executed when there exist a plurality of contiguous edges forming the largest interior angle, and there exist a plurality of contiguous edges forming the largest interior angle even when interior angles of edges next to the contiguous edges are compared with each other. In such a case, in the fourth application, the lengths of the contiguous edges are compared with each other, and a contiguous edge having a length larger than any other edge is determined as parting line.

Figure 20:
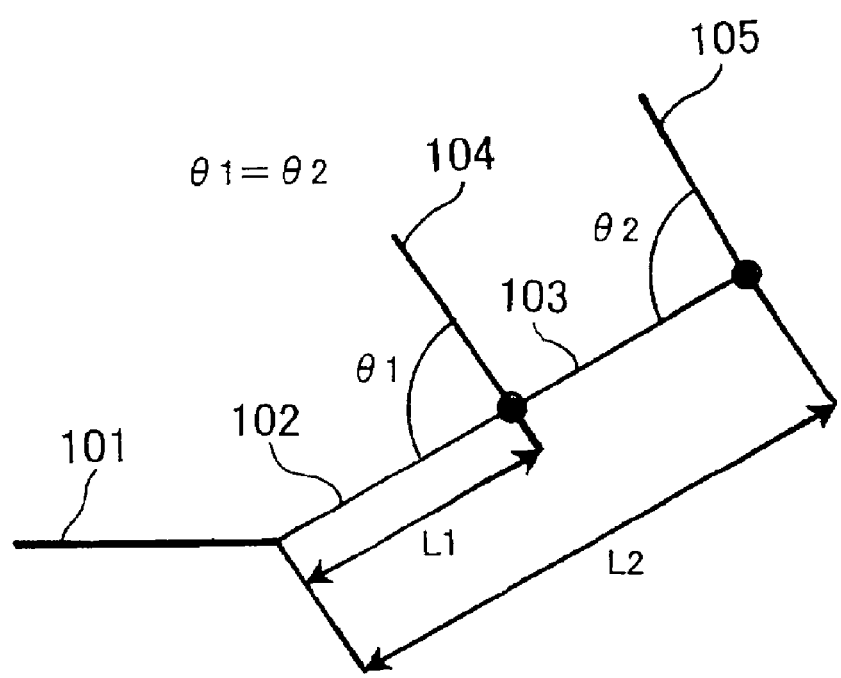
FIG. 20 is a diagram showing how the lengths of contiguous edges are compared with each other.

FIG. 20 shows how lengths of the edges are compared with each other. In the figure, when contiguous edges 102, 103 contiguous to a parting line 101 at an end point of the line are projected onto a plane perpendicular to the Z axis, the projected lines overlap each other. That is, tangents to the two contiguous edges 102, 103 form the same interior angle with a tangent to the parting line 101. Moreover, edges 104, 105 immediately next to the respective contiguous edges 102, 103 are contiguous to the contiguous edges 102, 103 at the same angle. In this case, the lengths of the two contiguous edges 102, 103 are compared with each other to determine the longer one as parting line. In the illustrated example, the contiguous edge 103 and the next edge 105 are set to a parting line.

Steps for carrying out the above process will be described hereinafter.

Figure 21:
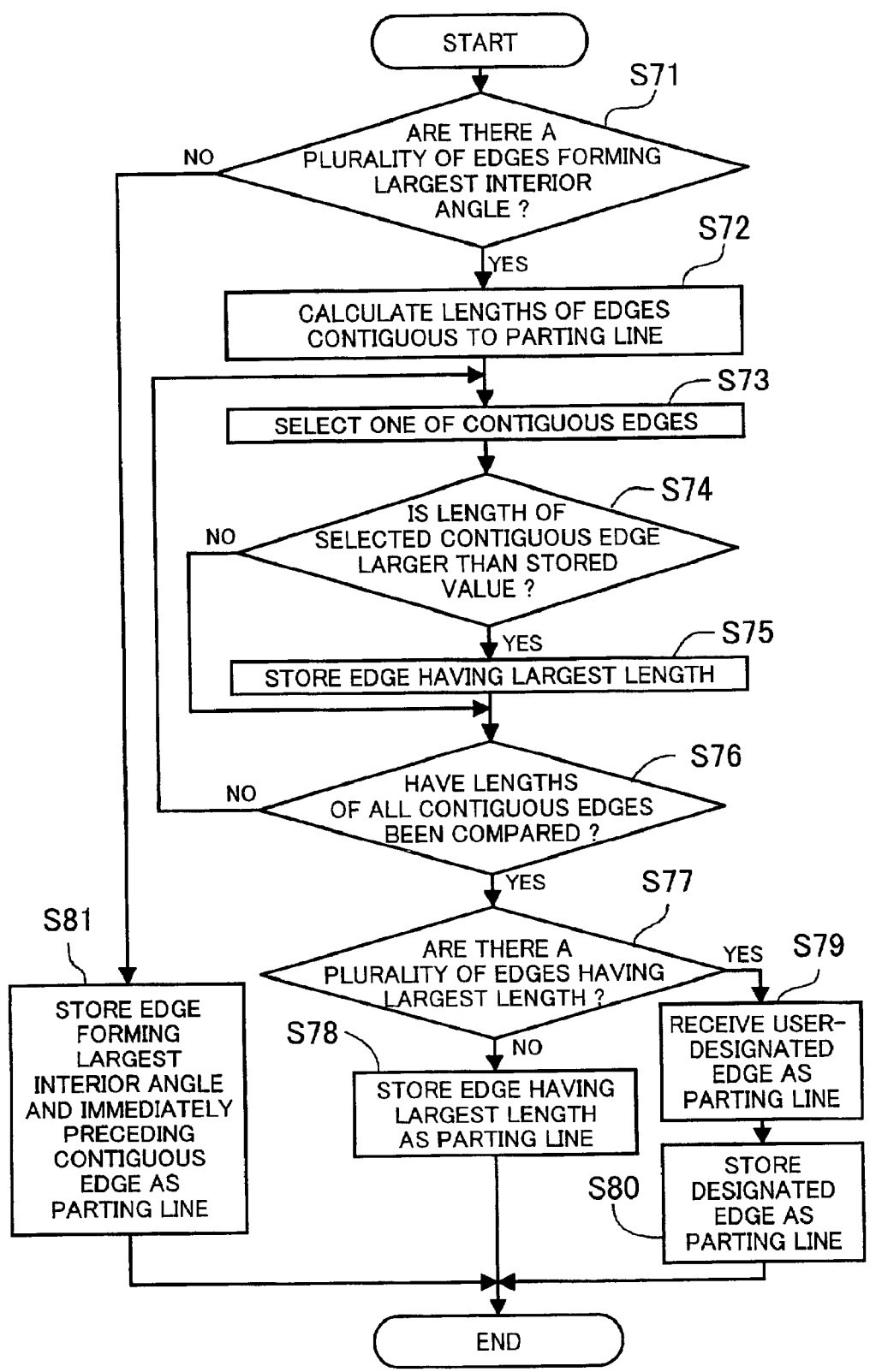
FIG. 21 is a flowchart showing process steps carried out when the lengths of contiguous edges are compared with each other.

FIG. 21 is a flowchart showing process steps carried out when the lengths of contiguous edges are compared with each other. This process is carried out in place of the step S59 in FIG. 19. Further, all the steps in this process are carried out by the parting line determination section 10bb.

[S71] It is determined according to the result of the comparison carried out at the step S56 in FIG. 19 whether or not there exist a plurality of edges forming the largest interior angle among edges immediately next to the contiguous edges. If there exist a plurality of edges, the program proceeds to a step S72, whereas if not, the program proceeds to a step S81.

[S72] The lengths of the contiguous edges forming the largest interior angle are measured.

[S73] One of the contiguous edges forming the largest interior angle is selected.

[S74] It is determine whether or not the length of the contiguous edge selected at the step S73 is equal to or larger than the value (initial value is "0") already stored. If the length is equal to or larger than the value already stored, the program proceeds to a step S75, whereas if not, the program proceeds to a step S76.

[S75] The length of the contiguous edge selected at the step S73 is stored as the largest length.

[S76] It is determine whether or not the lengths of all the contiguous edges forming the largest interior angle have been compared with each other. If the comparison of the lengths of all the contiguous edges has been made, the program proceeds to a step S77, whereas if not, the program proceeds to the step S73.

[S77] It is determined whether or not there exist a plurality of contiguous edges having the largest length. If there exist a plurality of contiguous edges, the program proceeds to a step S79, whereas if not, the program proceeds to a step S78.

[S78] The contiguous edge having the largest length is stored as parting line, followed by terminating the length comparison process.

[S79] User's designation of the edge to be set to a parting line is received.

[S80] The designated edge is stored as parting line, followed by terminating the length comparison process.

[S81] As the result of the comparison carried out at the step S56 in FIG. 19, if it is determined that there exists only one edge forming the largest interior angle, the edge forming the largest interior angle and the immediately preceding contiguous edge are each stored as parting line, followed by terminating the length comparison process.

In the processes described hereinabove, when a plurality of edges having the largest length are left behind, the user is prompted to designate a parting line. This is because the accuracy of automatically determining a parting line is reduced in the above status of the edges.

Figure 22:
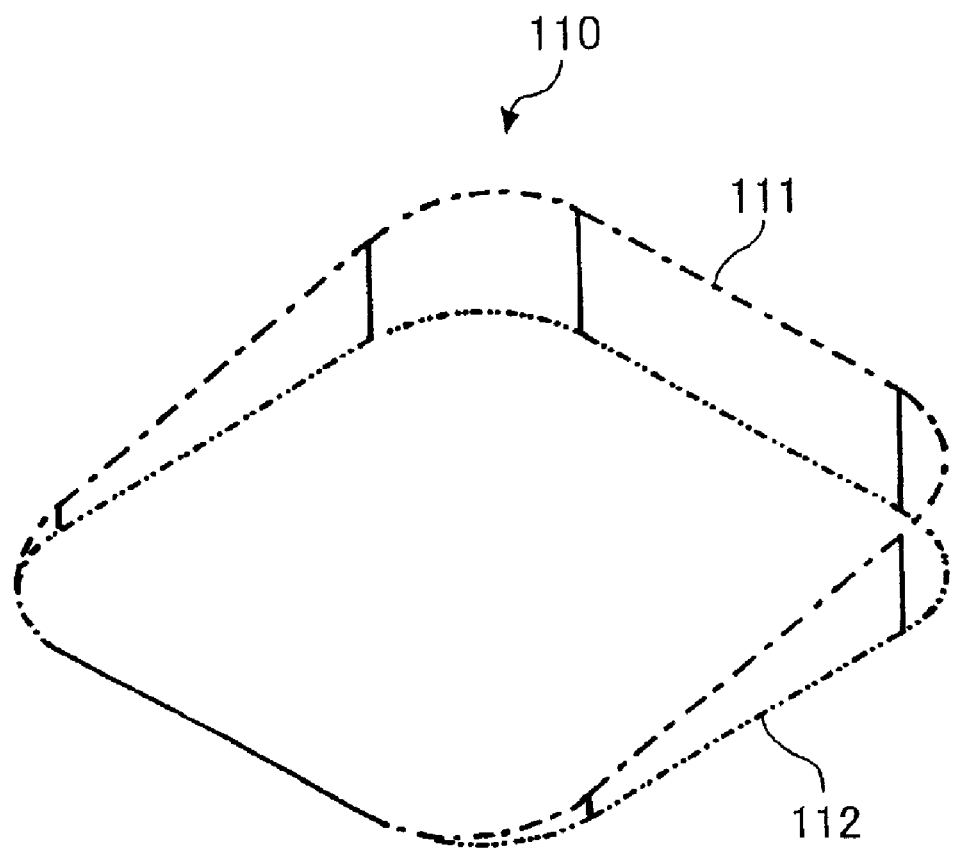
FIG. 22 is a diagram showing an example of a parting line which requires designation by the user.
Figure 22:
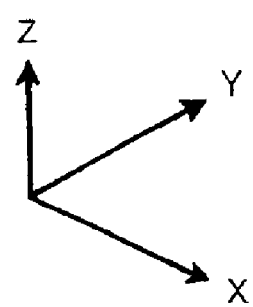

FIG. 22 shows an example of a parting line which requires designation by the user. All the side faces of a product shape 110 appearing in FIG. 22 are parallel to the mold opening direction (Z-axis direction). When a parting line forming the product shape 110 shown in the figure is calculated, two solutions of a parting line 111 and a parting line 112 can be obtained. If it is considered only that production of an undercut should be prevented, either of them may be determined as parting line. However, to determine an optimum parting line, it is required to take into account various factors, including portions where burrs are produced in molding the product. Therefore, when the two parting lines 111, 112 are obtained, a more accurate judgment can be expected if it is left to the user to determine which is proper. This is because designation by the user is received at the step S79 in the example described above.

Next, a fifth application will be described. The fifth application defines a process executed when there exists an edge parallel to the mold opening direction, as a contiguous edge. When en edge parallel to the mold opening direction exists among contiguous edges, it is impossible to calculate the degree of an interior angle in a graphic projected onto a flat plane. To overcome this problem, in the fifth application, determination by similarly comparing a next edge contiguous to the other end point of the contiguous edge parallel to the mold opening direction with another contiguous edge in respect of interior angle, a parting line is calculated.

Figure 23:
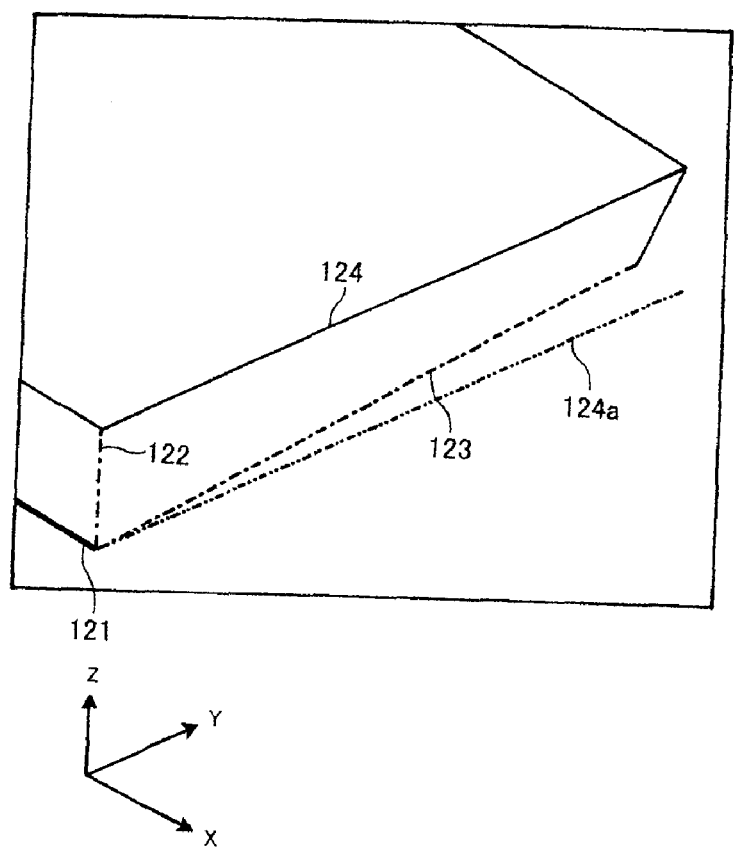
FIG. 23 is a diagram showing an example in which there is a contiguous edge parallel to the mold opening direction.

FIG. 23 shows an example in which there exists a contiguous edge parallel to the mold opening direction. In this example, there exist two contiguous edges 122, 123 contiguous to a parting line 121. Out of the contiguous edges 122, 123, the contiguous edge 122 is parallel to the Z axis. Therefore, when projected onto a two-dimensional plane perpendicular to the Z axis, the contiguous edge 122 is formed into only a point, whereby it is impossible to obtain an interior angle between the same and the parting line 121.

In such a case, an edge 124 immediately next to the contiguous edge 122, which is contiguous to the other end point of the contiguous edge 122, is detected to calculate an interior angle between the edge 124 and the parting line 121. A projected edge 124a formed by projecting the edge 124 onto a two-dimensional plane is located outward of the contiguous edge 123. That is, the interior angle of the edge 124 is larger than that of the contiguous edge 123. In this case, the contiguous edge 122 and the next edge 124 are determined as parting line.

Steps for carrying out the above process will be described hereinafter.

Figure 24:
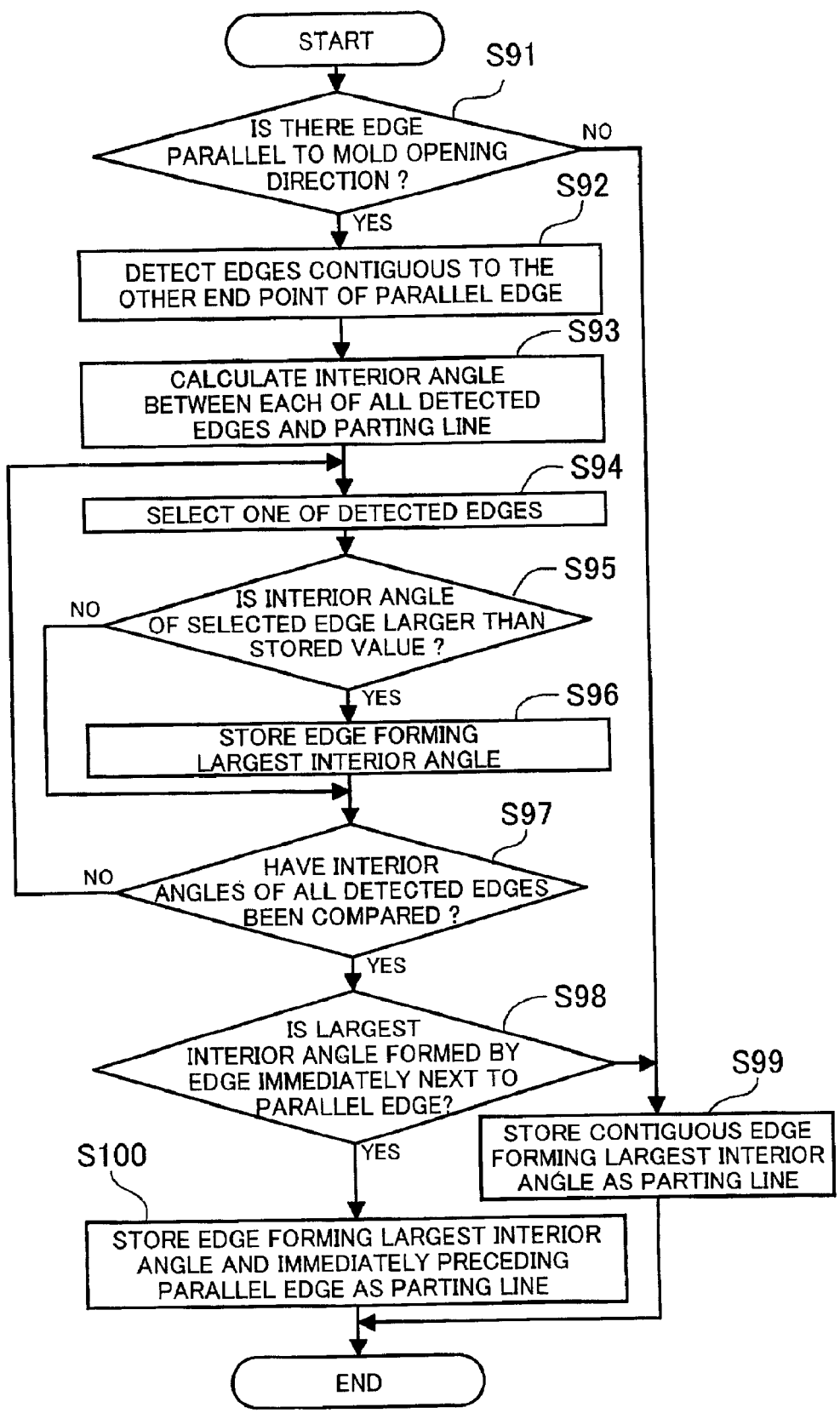
FIG. 24 is a flowchart showing process steps carried out when there is a contiguous edge parallel to the mold opening direction.

FIG. 24 is a flowchart showing process steps carried out when there exist a contiguous edge parallel to the mold opening direction. This process is carried out in place of the step S13 in FIG. 11. Further, all the steps in this process are carried out by the parting line determination section 10bb.

[S91] It is determined whether or not there exists an edge (hereinafter referred to as a "parallel edge") parallel to the mold opening direction among contiguous edges. If there exists a parallel edge, the program proceeds to a step S92, whereas if not, the program proceeds to a step S99.

[S92] Edges contiguous to the other end point of the parallel edge are detected.

[S93] An interior angle between each of all the edges detected at the step S92 and a parting line is calculated.

[S94] One of the edges detected at the step S92 is selected.

[S95] It is determined whether or not the interior angle between the edge selected and the parting line is equal to or larger than the value of the interior angle stored at the step S11 in FIG. 11. If the interior angle is equal to or larger than the value of the interior angle stored, the program proceeds to a step S96, whereas if not, the program proceeds to a step S97.

[S96] The interior angle between the edge selected at the step S94 and the parting line is stored as the maximum value of the interior angle.

[S97] It is determined whether or not the interior angles of all the edges detected at the step S92 have been compared with each other. If all the edges have been compared in respect of internal angle, the program proceeds to a step S98, whereas if not, the program proceeds to the step S94.

[S98] It is determined whether or not an edge immediately next to the parallel edge forms the largest interior angle. If the edge immediately next to the parallel edge forms the largest interior angle, the program proceeds to a step S100, whereas if not, the program proceeds to a step S99.

[S99] The contiguous edge forming the largest interior angle is stored as parting line, followed by the program proceeding to the step S14 in FIG. 11.

[S100] The edge forming the largest interior angle and the parallel edge immediately preceding the edge are determined as parting line, followed by the program proceeding to the step S14 in FIG. 11.

In this way, even if there exists a contiguous edge parallel to the mold opening direction, it is possible to determine an appropriate parting line.

Next, a sixth application will be described. The sixth application defines a process executed when automatic calculation of a parting line fails. More specifically, even when the processes described above are carried out, the automatic calculation of a parting line can fail. To avoid such an inconvenience at an early stage, it is required to interrupt an automatic determination process. The method of checking an error in performing the automatic calculation includes a method of detecting whether or not there exists a parting line other than a first parting line among contiguous edges.

Figure 25:
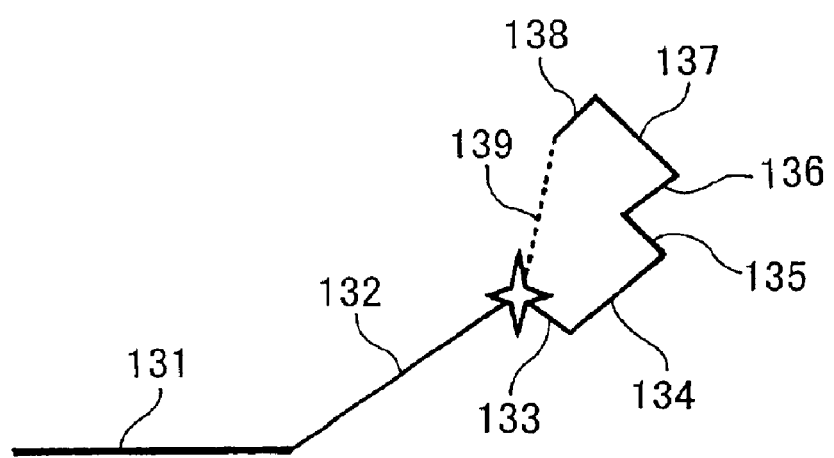
FIG. 25 is a diagram showing an example of a case in which an edge is connected to a parting line other than a first parting line.

FIG. 25 shows an example of a case in which an edge is connected to a parting line other than a first parting line. In this figure, it is assumed that parting lines are determined in the order of a first parting line 131, and parting lines 132 to 138. Here, a parting 139 which has been selected from edges contiguous to the parting line 138 is contiguous to the parting lines 132, 133, not to the first parting line 131. In such a case, the condition that a parting line is located along the outermost periphery of the product to form one loop is not fulfilled, and hence it is required to correct a determined parting line.

Steps for carrying out the above process will be described hereinafter.

Figure 26:
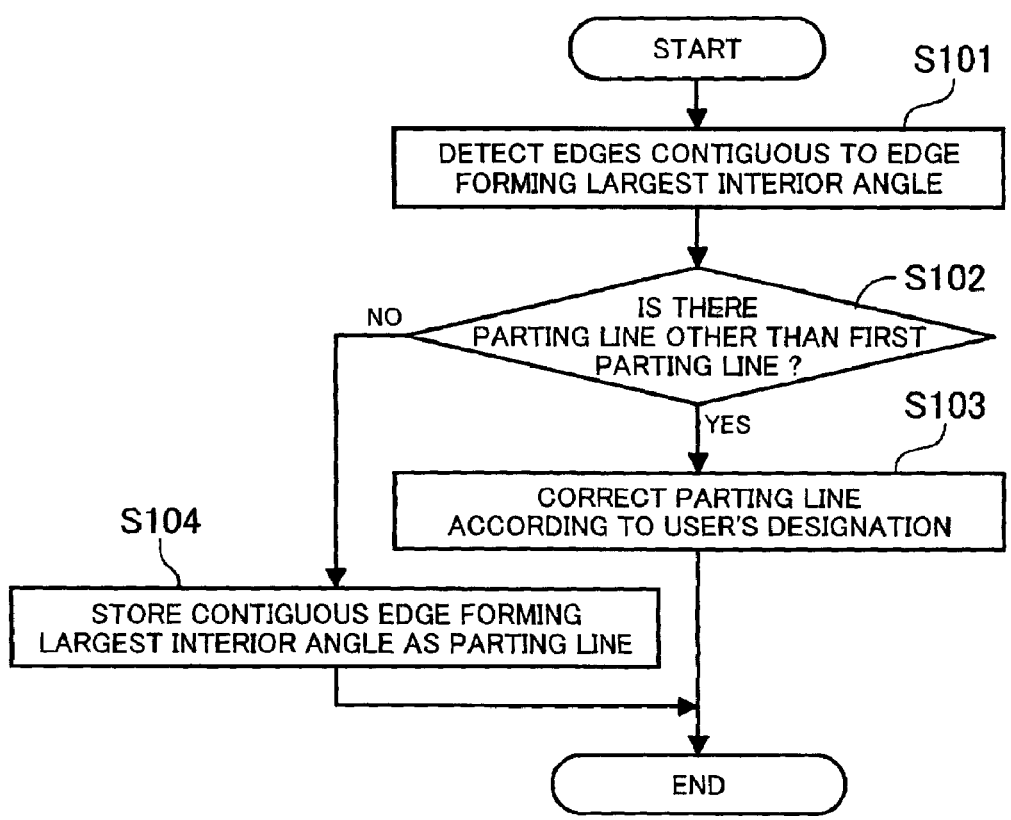
FIG. 26 is a flowchart showing process steps carried out when there is an intermediate parting line among contiguous edges.

FIG. 26 is a flowchart showing process steps carried out when there exist an intermediate parting line among contiguous edges. This process is carried out in place of the step S13 in FIG. 11. Further, all the steps in this process are carried out by the parting line determination section 10bb.

[S101] Contiguous edges contiguous to an edge forming the largest interior angle are detected.

[S102] It is determined whether or not there exists a parting line other than the first parting line among the edges detected at the step S101. If there exists such a parting line, the program proceeds to a step S103, whereas if such a parting line does not exist, the program proceeds to a step S104.

[S103] Designation by the user is received, and the determined parting line is corrected, followed by executing the step S14 et seq. in FIG. 11.

[S104] The contiguous edge forming the largest interior angle is stored as parting line, followed by carrying out the step S14 et seq. in FIG. 11.

The above process makes it possible to detect failure of automatic calculation of a parting line at an early stage, even if the failure occurs, thereby enhancing the efficiency of the mold design operation.

Next, a seventh application will be described. The seventh application defines a process executed in another case in which of failure of the automatic calculation of a parting line. The failure of automatic calculation of a parting line includes a case in which a parting line crosses another parting line, in addition to the case described above in the sixth application.

Figure 27:
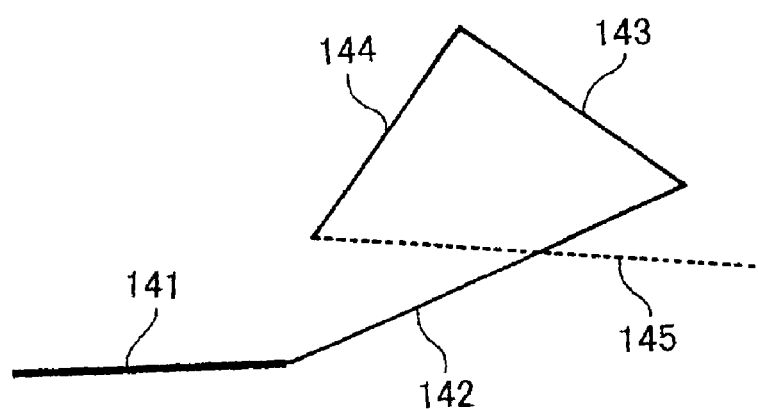
FIG. 27 is a diagram showing an example in which parting lines cross each other.

FIG. 27 shows an example in which parting lines cross each other. In this figure, it is assumed that parting lines are determined in the order of a first parting line 141 and parting lines 142 to 144. Here, a parting line 145 selected from edges contiguous to the parting line 144 crosses another parting line 142 which has already been determined. In such a case, the condition that a parting line is located along the outermost periphery of the product to form one loop is not fulfilled, and hence it is required to correct the determined parting line.

Steps for carrying out the above process will be described hereinafter.

Figure 28:
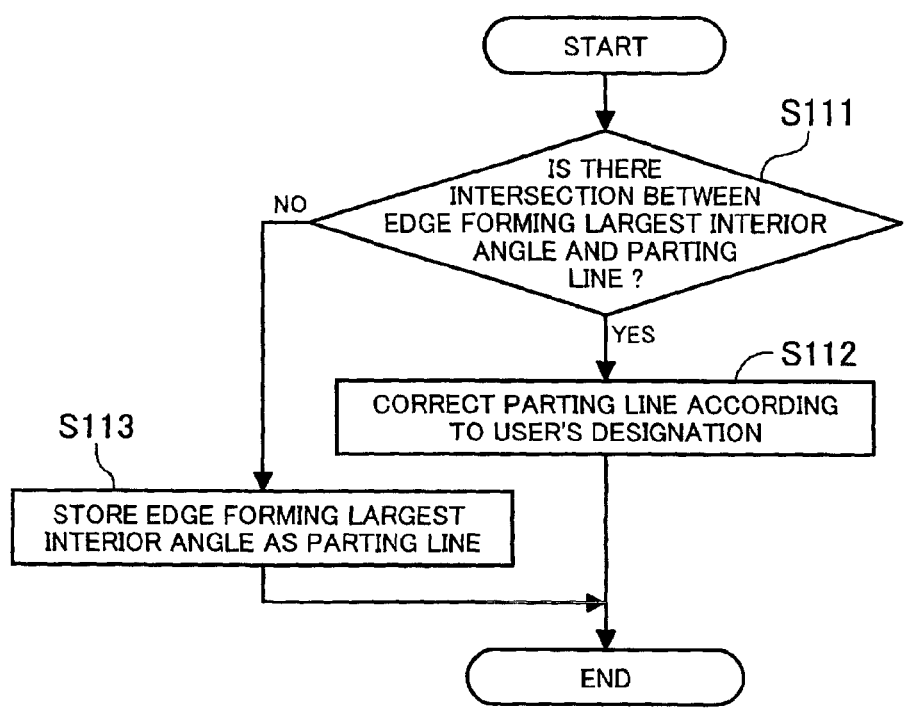
FIG. 28 is a flowchart showing process steps carried out when parting lines cross each other.

FIG. 28 is a flowchart showing process steps carried out when a parting lines crosses another parting line. This process is carried out in place of the step S13 in FIG. 11. Further, all the steps in this process are carried out by the parting line determination section 10bb.

[S111] It is determined whether or not there is an intersection between the contiguous edge forming the largest interior angle and a parting line already determined. If there is an intersection, it means that the parting lines crosses another. Therefore, when there is an intersection, the program proceeds to a step S112, whereas when there is not an intersection, the program proceeds to a step S113.

[S112] When there exists a parting line crossing the parting line, the user designates correction of the parting line, followed by carrying out the step S14 et seq. in FIG. 11.

[S113] If there is not an intersection, the edge forming the largest interior angle is stored as parting line, followed by executing the step S14 et seq. in FIG. 11.

The above processing makes it possible to detect failure of automatic calculation of a parting line at an early stage, even if the failure occurs, thereby enhancing the efficiency of the mold design operation,.

Next, an eighth application will be described. The eighth application defines a process executed when there exists an undercut portion. Although it is possible to determine a parting line by execution of processes described above, erroneous determination occurs at the undercut portion. In other words, it is required to employ a slide core at the undercut portion, so that in calculation of the parting line as well, it is necessary to determine the same in view of the information of the slide core.

Figure 29:
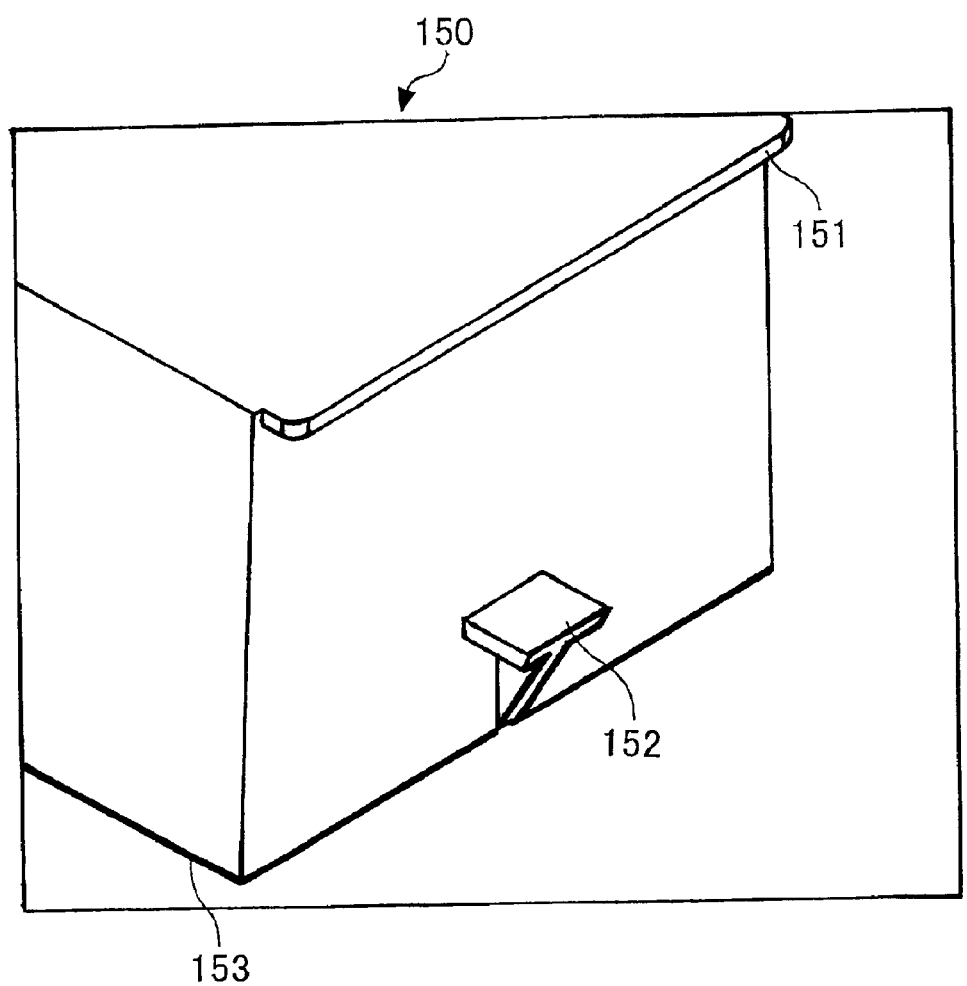
FIG. 29 is a diagram showing an example of determination of a parting line when there is an undercut portion.
Figure 29:
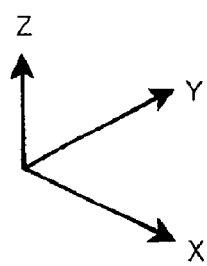

FIG. 29 illustrates an example of determination of a parting line when there is an undercut portion. This product shape 150 has an eaves-shaped portion 151, and a shelf-shaped portion 152. These portions inevitably produce undercuts if the mold is opened along the Z shape. Hence, even if a parting line is determined according to the above application to determine the parting line 153 as shown by a thick line in the figure, an undercut portion is formed at the shelf-shaped portion 152. A slide core is designed when such an undercut portion is included.

Figure 30:
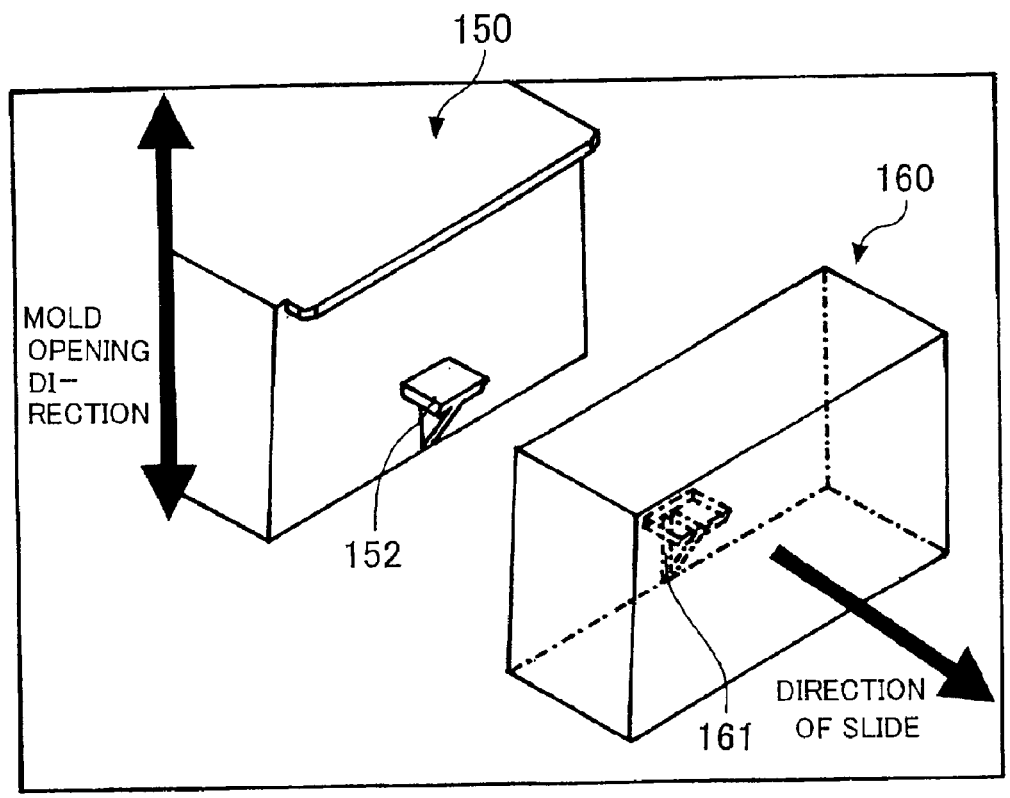
FIG. 30 is a diagram showing a slide core.
Figure 30:
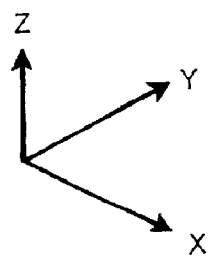

FIG. 30 shows a slide core. The slide core 160 formed in a manner corresponding to the product shape 150 is provided with a recess portion 161 having the same shape as that of the shelf-shaped portion 152 to be undercut. When the product is molded, the mold is opened vertically in the direction of the Z axis, and at the same time the slide core 160 is slid in the direction of an X axis. By using the slide core 160 designed as above, it is possible to avoid an undercut.

The slide core is determined at an early stage of the mold design operation. Therefore, if information of the slide core is taken into account when a parting line is determined, it is possible to increase the accuracy of the process of automatically calculating a parting line.

Figure 31:
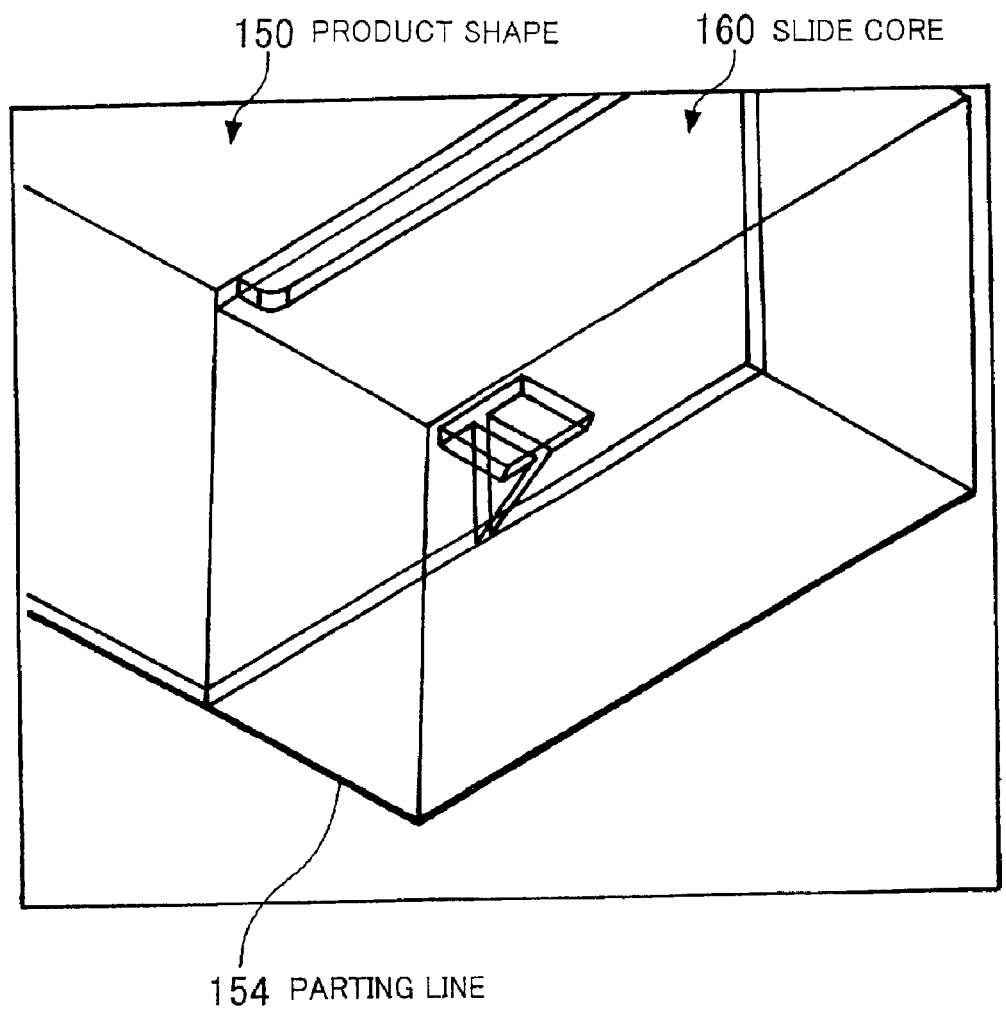
FIG. 31 is a diagram showing a parting line formed in view of the slide core.
Figure 31:
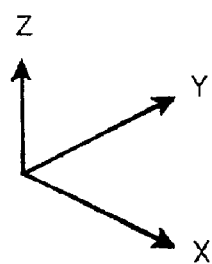

FIG. 31 shows a parting line formed in view of the slide core. As shown in the figure, when the shape of the slide core 160 is taken into account, a parting line 154 is determined along the outermost periphery of the product shape including the edge of the slide core 160.

When the parting line including the edge of the slide core is determined, not only the three-dimensional data of the product shape but also three-dimensional data of the slide score is passed to the two-dimensional projection section 10ba. Then, the two-dimensional projection section 10ba projects each edge constituting three-dimensional data onto a two-dimensional coordinate system based on three-dimensional data in which product shape data and slide core data are matched with each other. The parting line determination process is carried out based on two-dimensional data thus generated.

Steps for the parting line determination process will be described hereinafter.

Figure 32:
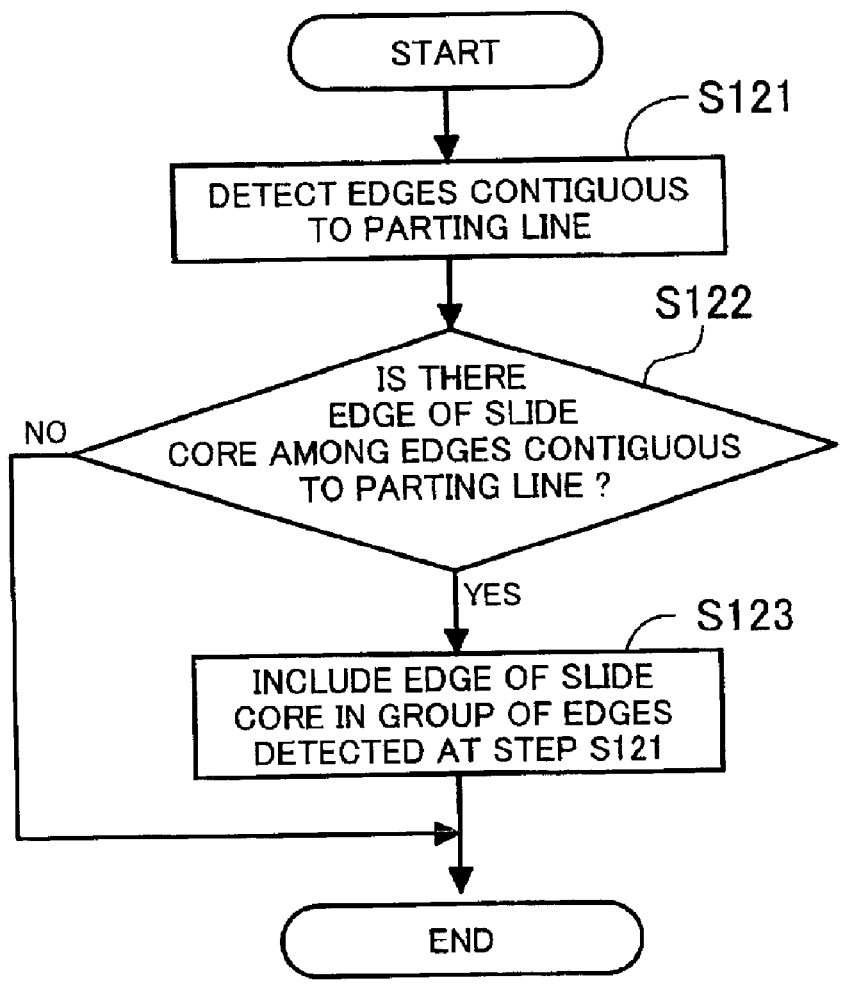
FIG. 32 is a flowchart showing process steps carried out when a parting line is formed in view of the slide core.

FIG. 32 is a flowchart showing process steps carried out when a parting line is formed in view of a slide core. This process is carried out in place of the contiguous edge detection step (steps S5, S14 in FIG. 11, step S52 in FIG. 19, and step S92 in FIG. 29) in the processes described above. Further, all the steps in this process are carried out by the parting line determination section 10bb.

[S121] Edges contiguous to the parting line are detected.

[S122] It is determined whether or not there exists an edge of the slide core among the edges detected at the S121. If there exists an edge of the slide core, the program proceeds to a step S123, whereas if not, the program is terminated.

[S123] When an edge of the slide core has been detected at the step S121, it is included in a group of the detected edges.

After termination of the above steps, the step for carrying out the contiguous edge detection process et seq. in each of the above-described flowcharts are executed.

As described hereinabove, by determining a parting line while taking the shape of the edges of a slide core as well into account, it is possible to accurately calculate a parting line in view of an undercut portion. This makes it possible to realize an efficient mold design operation irrespective of a product shape.

Now, to prompt the user to select a parting line, candidate edges for the parting line can be displayed on the screen of the display device, thereby enabling the user to select the parting line with ease.

Figure 33:
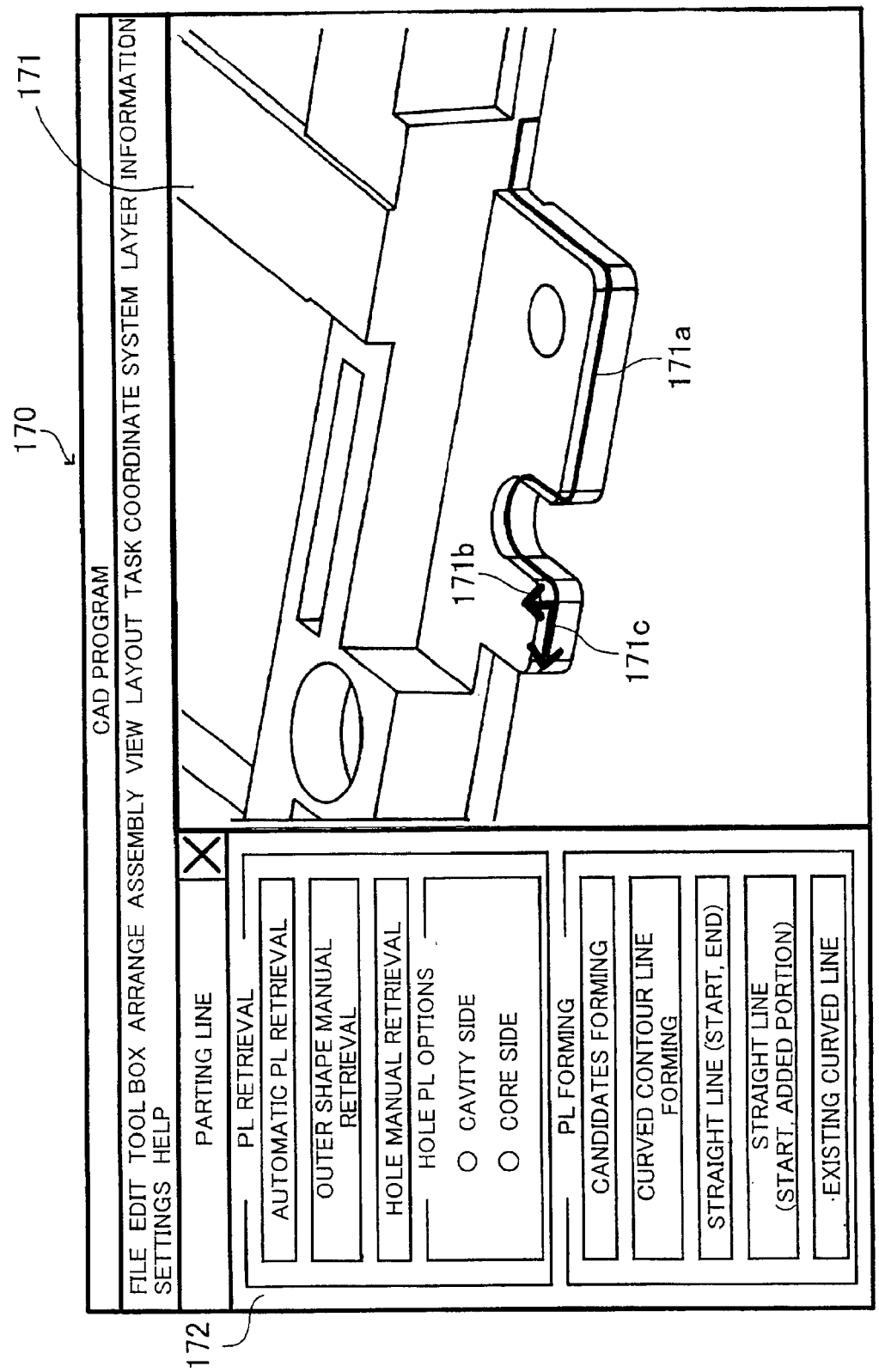
FIG. 33 is a diagram showing a screen displayed in prompting for selection of a parting line.
Figure 34:
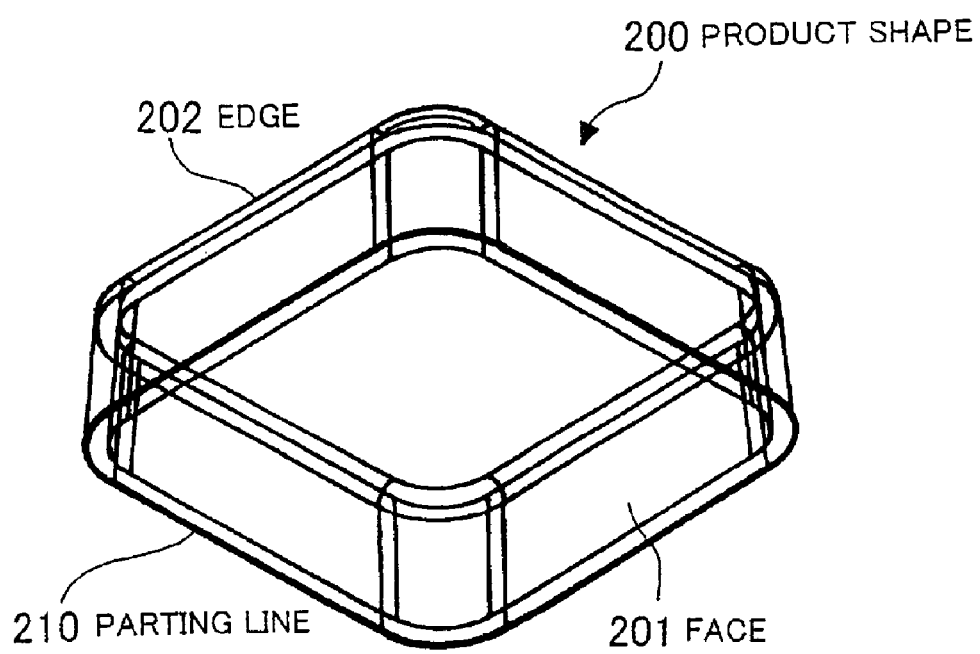
FIG. 34 is a diagram showing an example of CAD data of a product.
Figure 34:
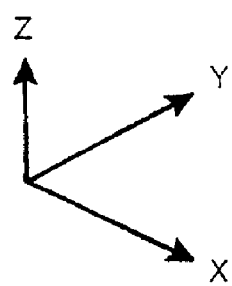
Figure 35:
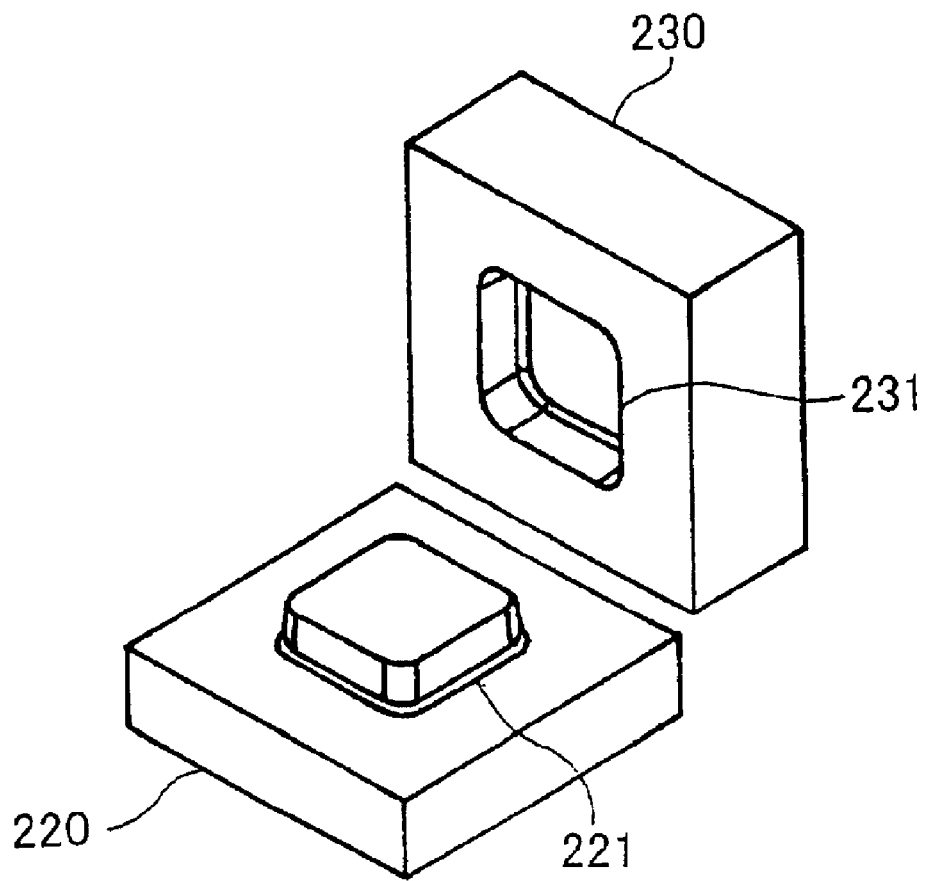
FIG. 35 is a diagram showing an example of a mold.
Figure 35:
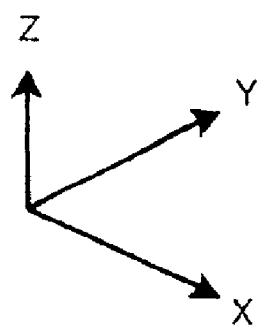
Figure 36:
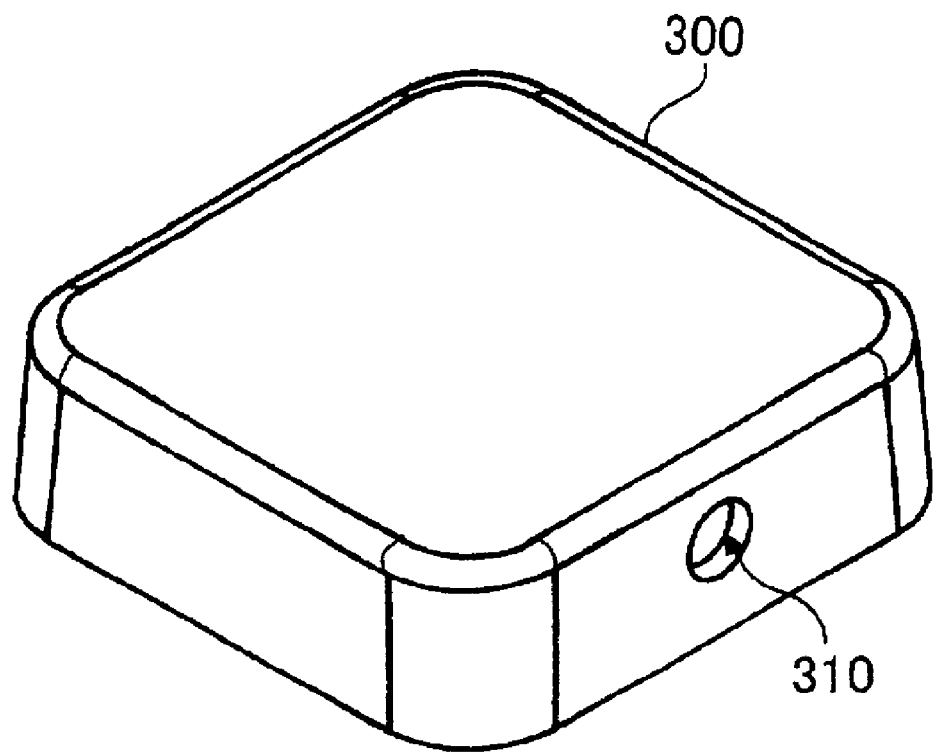
FIG. 36 is a diagram showing an example of three-dimensional CAD data of a product having an undercut portion.
Figure 36:
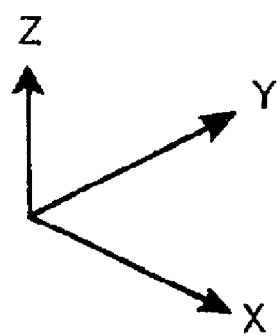
Figure 37:
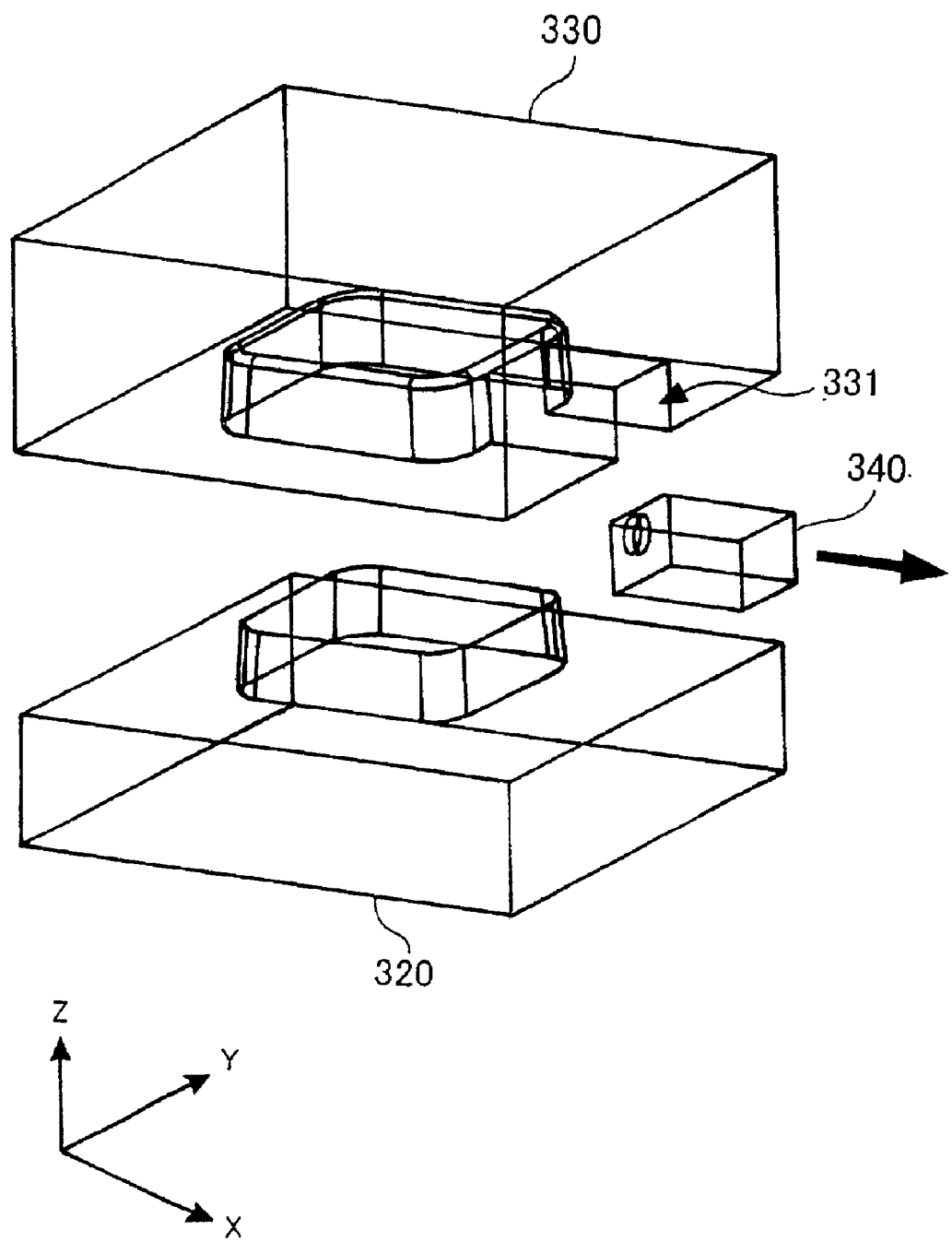
FIG. 37 is a diagram showing an example of a mold using a slide core.
Figure 38:
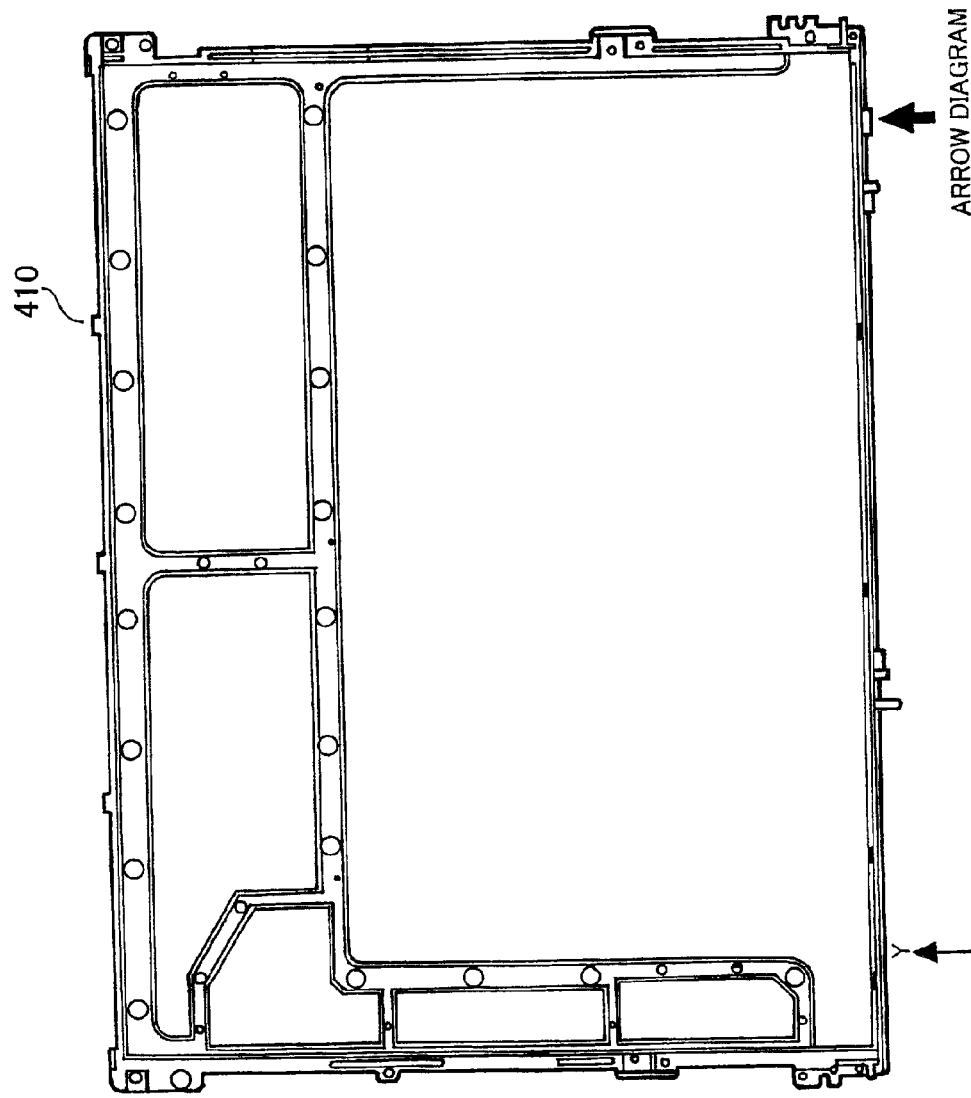
FIG. 38 is a diagram a two-dimensionally displayed product shape.
Figure 40:
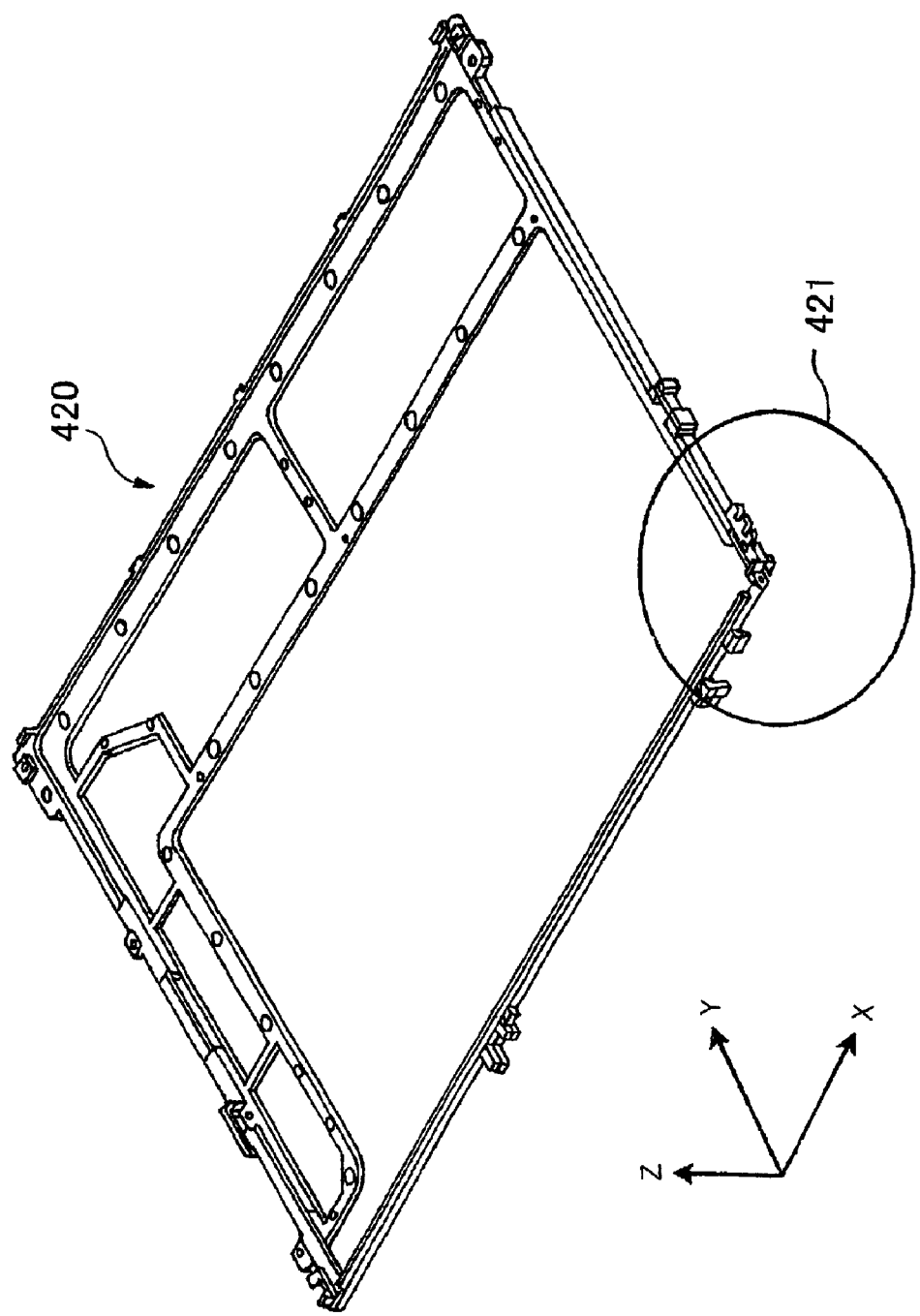
FIG. 40 is a diagram showing a three-dimensionally displayed product shape.
Figure 41:
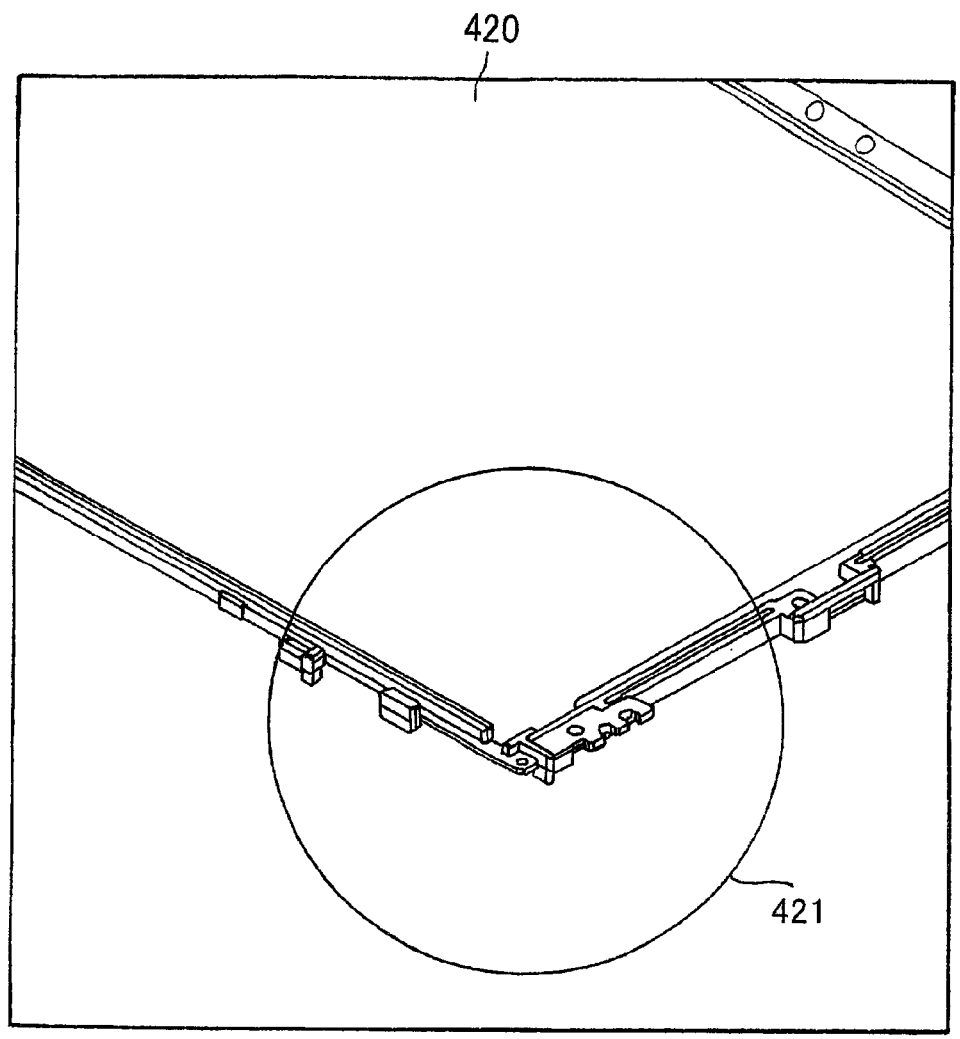
FIG. 41 is an enlarged partial view of the FIG. 40 product shape.

FIG. 33 shows a display screen displayed in prompting for selection of a parting line. The CAD program for realizing design functions of the present invention displays a window 170 including a product shape display screen 171, and a tool box 172 for use in editing parting lines. In the product shape display screen 171A is displayed part of a three-dimensional shape of the product. In the three-dimensional shape, a parting line 171a already determined is indicated by a thick line to distinguish the same from the other edges. Arrows are shown on edges 171b, 171c which are candidate edges for a parting line. The user is only required to designate an edge he considers suitable as parting line out of the edges 171b, 171c with the arrows.

As described above, presentation of candidate edges for a parting line on a three-dimensionally displayed product shape enables the user to designate a parting line promptly and accurately.

The contents of the above-described processes may be described in a program stored in a computer-readable recording medium. By executing the program by a computer, it is possible to perform the above-described processes. The computer-readable recording media includes a magnetic recording device, semiconductor memory and the like. To distribute the program to the market, the program may be stored in portable recording medium such as CD-ROMs (Compact Disk Read Only Memories) or floppy disks. Alternatively, the program may be stored in the storage device of a computer connected to a network and may be transferred to other computers through the network. To execute the program by a computer, the program stored in a hard disk unit or the like of the computer is loaded into the main memory and executed.

As described hereinbefore, according to the mold design system of the invention, edges of a product shape represented by three-dimensional graphic data are projected onto a plane perpendicular to a mold opening direction, and each contiguous edge which forms the largest interior angle with a determined parting line on the projected figure is sequentially determined as parting line. Therefore, the parting line of a mold can be automatically calculated. This makes it possible to enhance the efficiency of a mold design operation as well as reduce wrong operations in the course of the design operation.

Further, in a computer-readable recording medium storing the mold design program of the invention, a computer is caused to execute the stored mold design program, whereby it becomes possible to automatically calculate the parting line of a mold by using the computer.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mold design system for designing a mold for use in molding a product, comprising:
    two-dimensional projection means for producing two-dimensional projection data by projecting edges of a product shape represented by three-dimensional graphic data onto a plane perpendicular to a mold opening direction; and
    parting line determination means for sequentially determining, out of candidate edges contiguous to a determined parting line, a candidate edge forming a largest interior angle with said determined parting line at a contact point therewith on said two-dimensional projection data, as a parting line of said mold for molding said product shape, wherein
    when said candidate edge forming said largest interior angle intersects with another candidate edge an even number of times, said candidate edge is set as said parting line, and
    when said candidate edge forming said largest interior angle intersects with said other candidate edge an odd number of times, said other candidate edge is set as said parting line.

2. A mold design system according to claim 1, wherein said parting line determination means determines, out of the edges within said two-dimensional projection data, an edge whose middle point is positioned farthest from a central point of said product, as a first parting line.

3. A mold design system according to claim 1, wherein said parting line determination means outputs a selection request to a user when said candidate edge forming said largest interior angle with said determined parting line at said contact point therewith on said two-dimensional projection data crosses any other candidate edge at least two points, and determines a selected one of said candidate edges as said parting line.

4. A mold design system according to claim 1, wherein when there exist a plurality of candidate edges forming said largest interior angle with said determined parting line at said contact point therewith, said parting line determination means detects, out of other end-connected edges contiguous to other end points of said plurality of candidate edges, one of the plurality of candidate edges forming a largest interior angle with said determined parting line, and determines one of said candidate edges between said detected one and said determined parting line, as said parting line.

5. A mold design system according to claim 4, wherein when said parting line determination means is incapable of determining one of said candidate edges to be set to said parting line due to an existence of a plurality of said other end-connected edges forming said largest interior angle with said determined parting line, said parting line determination means determines, as said parting line, one of said plurality of said candidate edges forming said largest interior angle with said determined parting line at said contact point therewith, said one of said plurality of candidate edges having a largest length of all said plurality of said candidate edges.

6. A mold design system according to claim 1, wherein when there exists a parallel edge which is parallel to said mold opening direction among said candidate edges, said parting line determination means designates a maximum value of an interior angle between another end-connected edge contiguous to another end point of said parallel edge and said determined parting line, as said maximum value of an interior angle between said parallel edge and said determined parting line.

7. A mold design system according to claim 2, wherein when said determined parting line other than said first parting line exists among edges contiguous to another end point of said candidate edge forming said largest interior angle with said determined parting line at said contact point therewith, said parting line determination means prompts said user to select said parting line instead of determining said candidate edge forming said largest interior angle with said determined parting line at said contact point therewith, as said parting line.

8. A mold design system according to claim 1, wherein when said candidate edge forming said largest interior angle with said determined parting line at said contact point therewith crosses said determined parting line, said parting line determination means prompts said user to select said parting line instead of determining said candidate edge forming said largest interior angle with said determined parting line at said contact point therewith, as said parting line.

9. A mold design system according to claim 1, wherein said two-dimensional projection means generates said two-dimensional projection data including edges of said slide core, when a shape of said slide core is determined, and
wherein said parting line determination means carries out a parting line determining process while taking said edges of said slide core as well into account.

10. A computer-readable recording medium which stores a mold design program for use in designing a mold for molding a product, the program comprising:
two-dimensional projection means for producing two-dimensional projection data by projecting edges of a product shape represented by three-dimensional graphic data onto a plane perpendicular to a mold opening direction; and
parting line determination means for sequentially determining, out of candidate edges contiguous to a determined parting line, a candidate edge forming a largest interior angle with said determined parting line at a contact point therewith on said two-dimensional projection data, as a parting line of said mold for molding said product shape, wherein
when said candidate edge forming said largest interior angle intersects with another candidate edge an even number of times, said candidate edge is set as said parting line, and
when said candidate edge forming said largest interior angle interests with said other candidate edge an odd number of times, said other candidate edge is set as said parting line.

11. An apparatus for designing a mold of a 3D product, the apparatus comprising:
means for producing 2D projection data by projecting edges of a shape of the 3D product onto a plane perpendicular to a mold opening direction of the mold;
means for determining a parting line of the mold corresponding to an outermost edge out of the projecting edges of the shape of the 3D product;
means for determining the projected edges which are contiguous to the determined parting line; and
means for selecting the contiguous projected edge having a largest interior angle with the determined parting line, to be the parting line, wherein when the contiguous projected edge selected intersects with another contiguous projected edge an even number of times, the contiguous projected edge selected is set as the parting line, and when the contiguous projected edge selected intersects with the other contiguous projected edge an odd number of times, the other contiguous projected edge is set as the parting line.

12. A method for designing a mold of a 3D product, the method comprising:
producing 2D projection data by projecting edges of a shape of the 3D product onto a plane perpendicular to a mold opening direction of the mold;
determining a parting line of the mold corresponding to an outermost edge out of the projecting edges of the shape of the 3D product;
determining the projected edges which are contiguous to the determined parting line; and
selecting the contiguous projected edge having a largest interior angle with the determined parting line, to be the parting line, wherein when the contiguous projected edge selected intersects with another contiguous projected edge an even number of times, the contiguous projected edge selected is set as the parting line, and when the contiguous projected edge selected intersects with the other contiguous projected edge an odd number of times, the other contiguous projected edge is set as the parting line.

13. An apparatus to create a mold of a 3D product, the apparatus comprising:

a 2D projection unit to produce 2D projection data by projecting edges of a shape of the 3D product onto a plane perpendicular to a mold opening direction of the mold;

a parting line determination unit to determine a parting line of the mold corresponding to an outermost edge out of the projecting edges of the shape of the 3D product and to determine the projected edges which are contiguous to the determined parting line; and means for selecting the contiguous projected edge having a largest interior angle with the determined parting line, to be the parting line, wherein when the contiguous projected edge selected intersects with another contiguous projected edge an even number of times, the contiguous projected edge selected is set as the parting line, and when the contiguous projected edge selected intersects with the other contiguous projected edge an odd number of times, the other contiguous projected edge is set as the parting line.

* * * * *